United States Patent [19]
Chen et al.

[11] Patent Number: 6,114,463
[45] Date of Patent: *Sep. 5, 2000

[54] COPOLYMERS BASED ON VINYL UNITS AND THEIR USE IN ELECTROLUMINESCENT DEVICES

[75] Inventors: Yun Chen, Krefeld; Burkhard Köhler, Leverkusen; Rolf Wehrmann, Krefeld; Andreas Elschner, Mülheim; Ralf Dujardin, Willich, all of Germany

[73] Assignee: Bayer AG, Germany

[*] Notice: This patent is subject to a terminal disclaimer.

[21] Appl. No.: 08/909,278

[22] Filed: Aug. 11, 1997

[30] Foreign Application Priority Data

Aug. 16, 1996 [DE] Germany ............... 196 32 949

[51] Int. Cl.[7] .................. C08G 18/30

[52] U.S. Cl. ............ 525/328.2; 525/329.7; 525/329.9; 526/301; 526/259; 526/260; 526/261; 526/262; 526/265; 526/263; 526/267; 526/268; 526/270; 526/280; 526/285; 526/286; 526/288; 252/301.35; 313/483

[58] Field of Search ............ 525/328.2, 329.7, 525/329.9; 526/301, 259, 260, 261, 262, 265, 263, 267, 268, 270, 280, 285, 286, 288; 252/301.35; 313/483; 428/917; 528/74

[56] References Cited

U.S. PATENT DOCUMENTS

| | | | |
|---|---|---|---|
| 3,330,834 | 7/1967 | Senshu ............... | 260/281 |
| 3,408,338 | 10/1968 | Szita et al. ............... | 260/79.3 |
| 3,821,383 | 6/1974 | Sestanj et al. ............... | 424/258 |
| 4,254,109 | 3/1981 | Sestanj ............... | 424/178 |
| 4,539,507 | 9/1985 | Vanslyke et al. ............... | 313/504 |
| 4,598,081 | 7/1986 | Efimov et al. ............... | 514/296 |
| 4,720,432 | 1/1988 | Vanslyke et al. ............... | 428/457 |
| 4,769,262 | 9/1988 | Ferrar et al. ............... | 428/35 |
| 4,769,292 | 9/1988 | Tang et al. ............... | 428/690 |
| 5,077,142 | 12/1991 | Sakon et al. ............... | 428/690 |
| 5,235,045 | 8/1993 | Lewis et al. ............... | 534/560 |
| 5,286,803 | 2/1994 | Lindsay et al. ............... | 525/329.7 |
| 5,298,583 | 3/1994 | Heiliger et al. ............... | 526/286 |
| 5,310,719 | 5/1994 | Wehrmann et al. ............... | 503/227 |
| 5,384,378 | 1/1995 | Etzbach et al. ............... | 526/256 |
| 5,414,069 | 5/1995 | Cumming et al. ............... | 528/310 |
| 5,420,136 | 5/1995 | Lewis et al. ............... | 514/296 |
| 5,442,021 | 8/1995 | Heiliger ............... | 526/241 |
| 5,587,444 | 12/1996 | Uchida et al. ............... | 526/247 |
| 5,650,456 | 7/1997 | Yun et al. ............... | 524/110 |
| 5,891,975 | 4/1999 | Chen et al. ............... | 526/256 |

FOREIGN PATENT DOCUMENTS

| | | |
|---|---|---|
| 0 206 322 | 12/1986 | European Pat. Off. . |
| 0 294 061 | 12/1988 | European Pat. Off. . |
| 0 387 715 | 9/1990 | European Pat. Off. . |
| 0 406 762 | 1/1991 | European Pat. Off. . |
| 0 443 861 | 8/1991 | European Pat. Off. . |
| 503 439 | 9/1992 | European Pat. Off. . |
| 0 532 798 | 3/1993 | European Pat. Off. . |
| 0 564 224 | 10/1993 | European Pat. Off. . |

(List continued on next page.)

OTHER PUBLICATIONS

Burn et al., *Synthesis of a Segmented Conjugated Polymer Chain Giving a Blue-shifted Electroluminescence and Improved Efficiency*, J. Chem. Soc., Chem. Commun., pp. 32–34 (1992).

Tokito et al., *Polyarylenevinylene films prepared from precursor polymers soluble in organic solvents*, Polymer, vol. 32, pp. 1137–1141 (Jun., 1990).

Grem et al., *Realization of a Blue–Light–Emitting Device using Poly(p-phenylene)*, Advanced Materials 4, (1992) No. 1, pp. 36–37.

(List continued on next page.)

*Primary Examiner*—Rachel Gorr
*Attorney, Agent, or Firm*—Connolly, Bove, Lodge & Hutz LLP

[57] ABSTRACT

The present invention relates to (co)polymers which contain at least one repeating structural chain unit of the general formula (1) and/or (2) and optionally repeating units of the general formula (3)

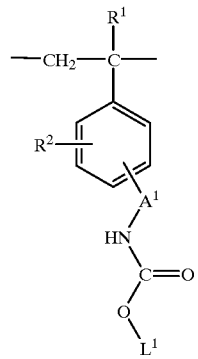

(1)

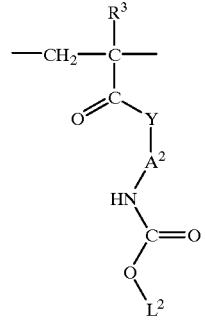

(2)

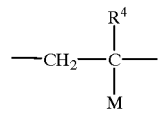

(3)

in which
$L^1$ and $L^2$, independently of each other, represent a photoluminescent grouping, a process for their preparation, their use in electroluminescent devices and the electroluminescent devices.

21 Claims, No Drawings

FOREIGN PATENT DOCUMENTS

| | | |
|---|---|---|
| 612 772 | 8/1994 | European Pat. Off. . |
| 0 686 662 | 12/1995 | European Pat. Off. . |
| 0 728 775 | 8/1996 | European Pat. Off. . |
| 735 055 | 10/1996 | European Pat. Off. . |
| 23 60 705 | 6/1975 | Germany . |
| 41 14 482 | 11/1992 | Germany . |
| WO 90/13148 | 11/1990 | WIPO . |
| WO 92/03490 | 3/1992 | WIPO . |
| WO 92/03491 | 3/1992 | WIPO . |
| WO 92/16023 | 9/1992 | WIPO . |

OTHER PUBLICATIONS

Colaneri et al., *Photoexcited states in poly (p–phenylene vinylene): Comparison with trans, trans–distyrylbenzene, a model oligomer*, Physical Review B, vol. 42, No. 18, pp. 11 670–11 681 (Dec. 15, 1990).

Von Seggern et al., *Synthesis and structure–property relations of polymers for light emitting diodes based on isolated chromophore units*, Macromol. Chem. Phys. 195, pp. 2023–2037 (1994).

P. Halliday et al., *A Study on the Elimination Reaction of Sulfonium Polyelectrolyte Precursor Polymers to Poly(P––phenylenevinylene)*, J. Chem. Soc., Chem. Commun., pp. 1685–1687 (1992).

G.E. Johnson et al., *Electroluminescence from single layer molecularly doped polymer films*, Pure & Appl. Chem., vol. 67, No. 1, pp. 175–182, (1995).

Kido et al., *Single–layer white light–emitting organic electroluminescent devices based on dye–dispersed poly(N–vinylcarbazole)*, Appl. Phys. Lett. 67 (16), pp. 2281–2283 (Oct. 16, 1995).

Pommerehne et al., *Efficient Two Layer LEDs on a Polymer Blend Basis*, Advanced Materials, (1995), 7, No. 6, pp. 551–554.

Chem. Abstr. 116:372 210725e (1992).

Chem. Abstr. 99:662 22909z (1983).

Chem. Abstr. 117:647 35794y (1992).

Chem. Abstr. 81:120 154514e (1974).

Kim et al., Synthesis and Fluorescence Behavior of Poly [$\omega$–(1,8–naphthalimido) alkyl methacrylates] Polymer Journal vol. 26, No. 4, pp. 397–402 (1994).

Abstract of D.H. Choi et al., *Synth. Met.* 71 (1–3), 1731–2 (1995).

Bisberg et al., *Excimer Emission and Wave Length Control from Light–Emitting Diodes Based on Side–Chain Polymers*, Macromolecules, vol. 28, No. 1, pp. 386–389 (Jan. 2, 1995).

Patent Abstracts of Japan, vol. 12, No. 230 (C–508), Abstract of JP 63023901 (Feb. 1, 1988).

Patent Abstracts of Japan, Abstract of JP 4300991 (Oct. 23, 1992).

Chem. Abstr. 120:310930u (Jun. 13, 1994).

Appl. Phys. Lett. 57, No. 6, pp. 531–533 (Aug. 6, 1990).

Ai et al., CA 111:164206 (1989).

Derwent Abstract of SU 726,116 (Apr. 7, 1980).

COPOLYMERS BASED ON VINYL UNITS AND THEIR USE IN ELECTROLUMINESCENT DEVICES

BACKGROUND OF THE INVENTION

1. Field of the Invention

In the development of light-emitting components for electronic or photonic applications, inorganic semiconductors such as gallium arsenide are mostly used. Point display elements can be prepared from these types of substances. It is not possible to produce display elements with large areas.

2. Description of the Prior Art

In addition to semiconductor light-emitting diodes, electroluminescent devices based on vapour-deposited low-molecular weight organic compounds are known (U.S. Pat. No. 4,539,507, U.S. Pat. No. 4,769,262, U.S. Pat. No. 5,077,142, EP-A 406 762). Again, only small LEDs can be produced with these materials, as a result of the method of manufacture. In addition, these electroluminescent devices have a high production cost and the vapour-deposited amorphous layer is prone to morphological changes which can cause a reduction in the intensity of electroluminescence and the operating time.

Polymers such as poly-(p-phenylenes) and poly-(p-phenylenevinylenes) are described as electroluminescent: G. Leising et al., Adv. Mater. 4 (1992) no. 1; Friend et al., J. Chem. Soc., Chem. Commun. 1992, p. 32–34; Saito et al., Polymer, 1990, vol. 31, 1137; Friend et al., Physical Review B, vol. 42, no. 18, 11670 or WO 90/13148.

In contrast to fully conjugated polymers, polycondensates which are not fully conjugated and which have luminescent structural units are also described in electroluminescent devices (Macromol. Chem. Phys. 195, 2023–2037 (1994)).

In contrast to other materials, polymeric substances for use in electroluminescent devices are characterised by good mechanical and thermal stability. In addition, the production of large surface area light-emitting elements may be enabled due to the possibility of casting and spin-coating polymeric substances.

SUMMARY OF THE INVENTION

The present invention provides polymers based on polystyrene and polyacrylate, with covalently bonded luminophore units in side chains, for constructing electroluminescent devices, wherein linkage is achieved by urethane formation between an isocyanate-functional polymer and hydroxy-functional fluorescent dyes. These types of polymer are of industrial interest for use as electroluminescent materials due to their simple production and good processing properties.

DESCRIPTION OF THE PREFERRED EMBODIMENTS

The present invention provides (co)polymers which contain a repeating structural chain unit of the general formula (1) and/or (2) and optionally repeating units of the general formula (3) from

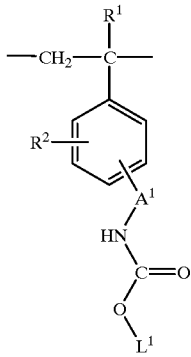

(1)

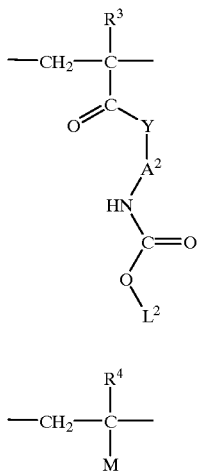

(2)

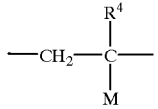

(3)

in which $R^1$, $R^3$ and $R^4$, independently of each other, represent hydrogen or a $C_1$–$C_6$-alkyl group, $R^2$ represents hydrogen or a $C_1$–$C_{30}$-alkyl, $C_6$–$C_{18}$-aryl or $C_1$–$C_{30}$-alkoxy group, M represents CN or a $C_1$–$C_{30}$-alkoxycarbonyl, $C_1$–$C_{30}$-(di)alkyl-aminocarbonyl, or $C_1$–$C_{30}$-alkylcarbonyl group, each of which may be substituted by a hydroxy or $C_1$–$C_6$-alkoxycarbonyl group, furthermore for phenyl, naphthyl, anthracenyl, pyridinyl or carbazolyl, each of which may be substituted by groups selected from the set consisting of halogen, hydroxy, silyl, $C_1$–$C_{30}$-alkyl, $C_6$–$C_{18}$-aryl, $C_1$–$C_{30}$-alkoxy, $C_1$–$C_{30}$-alkoxycarbonyl, $C_1$–$C_{30}$-acyloxy, $C_1$–$C_{30}$-alkylcarbonyl, Y represents oxygen, sulphur or —$NR^o$—, wherein $R^o$ represents hydrogen or a $C_1$–$C_6$-alkyl group, $A^1$ and $A^2$, independently of each other, represent $C_6$–$C_{18}$-arylene or $C_1$–$C_{30}$-alkylene groups whose aliphatic carbon chains may be interrupted by one to three hetero-atoms such as oxygen, sulphur and/or by one to two, optionally substituted by $C_1$–$C_6$-alkyl group, phenylenes or naphthylenes, and $L^1$ and $L^2$, independently of each other, represent a photoluminescent group, wherein the proportion of structural units of the formula (3) is 0 to 99.5 mol-%, preferably 40 to 99.5 mol-% and the proportion of each of the structural units of the formula (1) and/or (2) is 0.5 to 100 mol-%, preferably 0.5 to 60 mol-%, and the sum of the molar proportions is 100, wherein the compound of the formula (A)

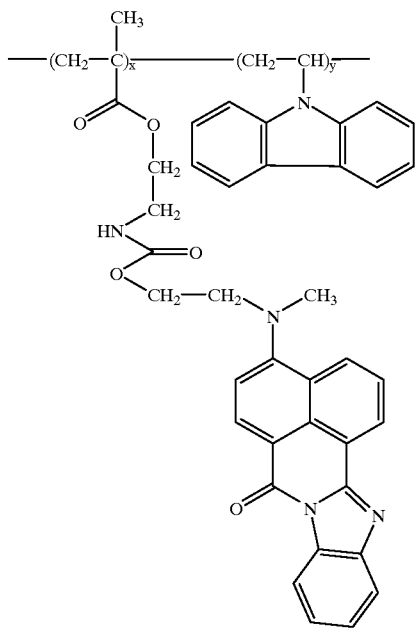

is excepted.

The (co)polymers may also comprise the structural units (1) and (2); (1), (2) and (3); (2) and (3) or only (2).

In the formulae mentioned above, $R^1$, $R^3$ and $R^4$, independently of each other, are preferably hydrogen, methyl or ethyl.

$R^2$ preferably represents hydrogen, a $C_1$–$C_6$ alkyl group or a phenyl group which is optionally substituted by methyl, ethyl, n-propyl and/or iso-propyl, M preferably represents CN or a $C_1$–$C_{15}$-alkoxycarbonyl, $C_1$–$C_{15}$-(di)alkyl-aminocarbonyl or $C_1$–$C_{15}$-alkylcarbonyl group, each of which may be substituted by hydroxy, methoxycarbonyl, ethoxycarbonyl, n-propoxycarbonyl and/or i-propoxycarbonyl, furthermore preferably for phenyl, naphthyl, anthracenyl, pyridinyl or carbazolyl, each of which may be substituted by groups selected from the set comprising halogen, hydroxy, silyl, a $C_1$–$C_6$-alkyl, $C_1$–$C_6$-alkoxy, $C_1$–$C_6$-alkoxycarbonyl, $C_1$–$C_6$-acyloxy, $C_1$–$C_6$-alkylcarbonyl group or a phenyl group, optionally substituted by methyl, ethyl, n-propyl and/or iso-propyl, Y preferably represents oxygen or —$NR^o$—, wherein $R^o$ preferably represents hydrogen or a $C_1$–$C_4$-alkyl group, in particular hydrogen, $A^1$ and $A^2$, independently of each other, preferably represent $C_6$–$C_{12}$ arylene groups, in particular phenylene or naphthylene, or $C_1$–$C_{12}$-alkylene groups whose aliphatic carbon chains may be interrupted by one to three heteroatoms such as O, S and/or by one to two phenylenes or naphthylenes, optionally substituted by a $C_1$–$C_6$-alkyl group, $L^1$ and $L^2$, independently of each other, represent a photoluminescent group which is based on the structural skeleton of a fluorescent dye, which is preferably selected from the set comprising coumarins of the formula (4)

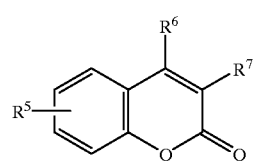

(4)

pyrenes of the formula (5)

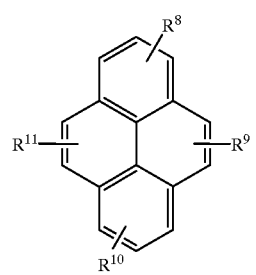

(5)

1,8-naphthalimides of the formula (6)

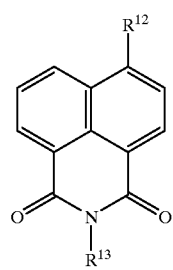

(6)

1,8-naphthaloylene-1',2'-benzimidazoles of the formula (7)

(7a)

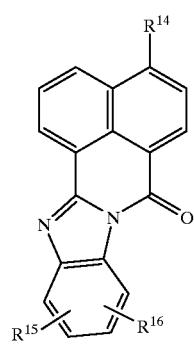

-continued

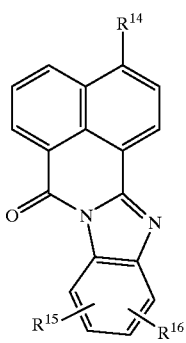

phenothiazines or phenoxazines of the formula (8)

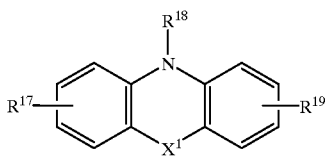

($X^1$ = O, S)

benzopyrenes of the formula (9)

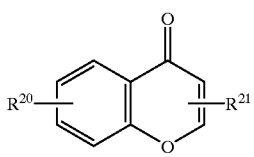

carbazoles, fluorenes, dibenzothiophenes and dibenzo-furanes of the formula (10)

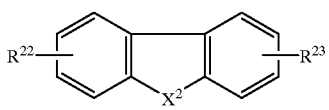

($X^2$ = $NR^{24}$, $CH_2$, S, O)

oxazoles, 1,3,4-oxadiazoles and 1,2,4-triazoles of the formula (11)

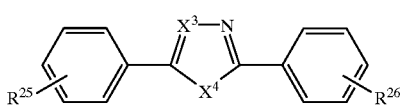

($X^3$ = CH, N, $X^4$ = O)

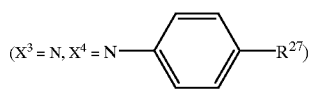

($X^3$ = N, $X^4$ = N—)

benzoquinolines of the formula (12)

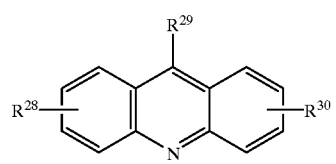

9,10-bis-(phenylethynyl)-anthracenes of the formula (13)

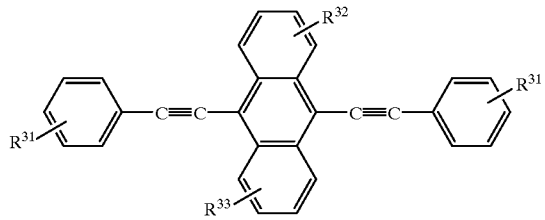

fluorones of the formula (14)

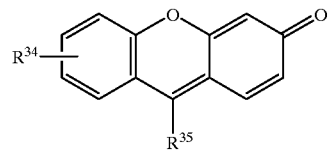

9,10-diphenylanthracene of the formula (15)

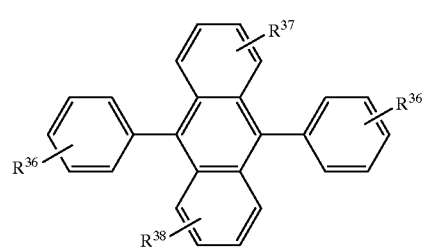

2-styrylbenzazole of the formula (16)

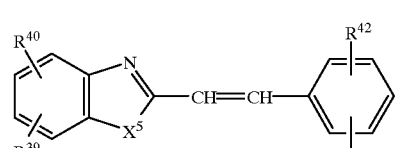

($X^5$ = O, S, Se, $CH_2$)

wherein
$R^5$ represents hydrogen or a $C_1$–$C_{30}$-alkyl, $C_6$–$C_{18}$-aryl, $C_7$–$C_{24}$-aralkyl or —$NR^{43}R^{44}$ group, wherein $R^{43}$ and $R^{44}$, independently of each other represent a $C_1$–$C_{30}$-alkyl, $C_6$–$C_{18}$-aryl or $C_7$–$C_{24}$-aralkyl group or together with the nitrogen atom to which they are bonded may represent a morpholine, piperidine, pyrrolidine or piperazine ring which may have one or two substituents from the group comprising methyl, ethyl and phenyl, $R^6$ represents hydrogen, cyano or a $C_1$–$C_{30}$-alkyl, $C_6$–$C_{18}$-aryl or $C_7$–$C_{24}$-aralkyl, $C_1$–$C_{30}$-alkoxy, $C_1$–$C_{12}$-alkylcarbonyl, $C_1$–$C_{12}$-alkoxycarbonyl, or $C_1$–$C_{12}$-(di)alkylaminocarbonyl group, $R^7$ represents hydrogen, cyano or a $C_1$–$C_{30}$-alkyl, $C_6$–$C_{18}$-aryl or $C_7$–$C_{24}$-aralkyl or $C_1$–$C_{30}$-alkoxy group or

wherein $Z^1$ represents an $OR^{45}$ or

group and $R^{45}$, $R^{46}$ and $R^{47}$, independently of each other, represent a $C_1$–$C_{30}$-alkyl, $C_6$–$C_{18}$-aryl or $C_7$–$C_{24}$-aralkyl group, wherein the aromatic rings may also be substituted with a halogen or a $C_1$–$C_6$-alkyl and/or $C_1$–$C_6$-alkoxy group, $R^8$ to $R^{10}$, independently of each other, represent hydrogen, cyano or a $C_1$–$C_{30}$-alkyl, $C_6$–$C_{18}$-aryl, $C_7$–$C_{24}$-aralkyl, $C_1$–$C_{30}$-alkoxy, $C_1$–$C_{12}$-alkylcarbonyl, $C_1$–$C_{12}$-alkoxycarbonyl group or an amino group with one or two $C_1$–$C_6$-alkyl groups, $R^{11}$ represents hydrogen, cyano or a $C_1$–$C_{30}$-alkyl, $C_6$–$C_{18}$-aryl, $C_7$–$C_{24}$-aralkyl, $C_1$–$C_{30}$-alkoxy, amino, $C_1$–$C_{12}$-alkylcarbonyl, $C_1$–$C_{12}$-alkoxycarbonyl or $C_1$–$C_{12}$-(di)alkylaminocarbonyl group, $R^{12}$ represents hydrogen, halogen, nitro or a $C_1$–$C_4$-alkylcarbonyl, $C_1$–$C_4$-alkoxycarbonyl or $C_8$–$C_{24}$-aralkenyl group, an unsubstituted amino group or an amino group substituted once or twice with identical or different $C_1$–$C_{30}$-alkyl, $C_6$–$C_{18}$-aryl or $C_7$–$C_{24}$-aralkyl groups, $R^{12}$ may also represent morpholinyl, piperidinyl, pyrrolidinyl or piperazinyl which may have one or two substituents from the group comprising methyl, ethyl and phenyl, $R^{13}$ represents hydrogen or a $C_1$–$C_{30}$-alkyl, $C_6$–$C_{18}$-aryl, $C_7$–$C_{24}$-aralkyl or $C_1$–$C_{30}$-alkoxy group, $R^{14}$ represents hydrogen or a $C_1$–$C_{30}$-alkyl, $C_6$–$C_{18}$-aryl, $C_7$–$C_{24}$-aralkyl or $C_1$–$C_{30}$-alkoxy group or a —$NR^{48}R^{49}$ group, wherein $R^{48}$ and $R^{49}$, independently of each other, represent a $C_1$–$C_{30}$-alkyl, $C_6$–$C_{18}$-aryl or $C_7$–$C_{24}$-aralkyl group or together with the nitrogen atom to which they are bonded may represent a morpholine, piperidine, pyrrolidine or piperazine ring, which may have one or two substituents from the group comprising methyl, ethyl and phenyl, $R^{15}$ and $R^{16}$, independently of each other, represent hydrogen, halogen, nitro or a $C_1$–$C_{30}$-alkyl, $C_6$–$C_{18}$-aryl, $C_7$–$C_{24}$-aralkyl, $C_1$–$C_{12}$-alkylcarbonyl, $C_1$–$C_{12}$-alkoxycarbonyl, $C_1$–$C_{30}$-alkoxy, $C_1$–$C_{12}$-(di)alkylaminocarbonyl or $C_1$–$C_6$-(di)alkylamino group, $R^{18}$ and $R^{24}$, independently of each other, represent hydrogen or a $C_1$–$C_{30}$-alkyl, $C_6$–$C_{18}$-aryl or $C_7$–$C_{24}$-aralkyl group, $R^{17}$, $R^{19}$ to $R^{23}$, $R^{25}$ to $R^{42}$, independently of each other represent hydrogen, cyano or a $C_1$–$C_{30}$-alkyl, $C_6$–$C_{18}$-aryl, $C_7$–$C_{24}$-aralkyl, amino, $C_1$–$C_{12}$-alkyl-carbonyl $C_1$–$C_{12}$-alkoxycarbonyl, $C_1$–$C_{30}$-alkoxy, $C_1$–$C_{12}$-(di)alkylaminocarbonyl or $C_1$–$C_6$-(di)alkylamino group, wherein at least one hydroxy group is located on an aliphatic carbon chain or in an aromatic ring in substituents of $R^5$ to $R^{42}$ and linkage of the photoluminescent groupings to the polymer side chains takes place by reaction of these hydroxy groups with an isocyanate group on the group $A^1$ or $A^2$ with formation of the urethane group (—NH—COO—).

The aliphatic hydrocarbon chain in the above-mentioned groups $R^5$ to $R^{42}$ may be interrupted by one to three hetero-atoms such as oxygen, sulphur and/or nitrogen and/or one or two phenylenes and naphthylenes, optionally substituted with a $C_1$–$C_6$-alkyl, preferably $C_1$–$C_4$-alkyl, group.

M represents, in particular, phenyl, naphthyl, anthracenyl, pyridinyl, carbazolyl, which may each be substituted by hydroxy, or a silyl, $C_1$–$C_4$-alkyl, $C_1$–$C_4$-alkoxy, $C_1$–$C_6$-alkoxycarbonyl, $C_1$–$C_6$-acyloxy or $C_1$–$C_6$-alkylcarbonyl group, or phenyl optionally substituted by methyl, ethyl, n-propyl and/or iso-propyl, $A^1$ and $A^2$, independently of each other, may be in particular a $C_1$–$C_6$-alkylene, in which the carbon chain may be interrupted by hetero-atoms selected from oxygen, sulphur and nitrogen, $L^1$ and $L^2$, independently of each other, represent in particular a grouping from fluorescent dyes from the group comprising coumarins of the formula (4), pyrenes of the formula (5), 1,8-naphthalimides of the formula (6), 1,8-naphthaloylene-1',2'-benzimidazoles of the formula (7), phenothiazines and phenoxazines of the formula (8), carbazoles and fluorenes of the formula (10).

In the above-named groups $R^5$ to $R^{49}$, $C_1$–$C_{30}$-alkyl is preferably $C_1$–$C_{16}$-alkyl, in particular $C_1$–$C_{12}$-alkyl; $C_6$–$C_{18}$-aryl, $C_7$–$C_{24}$-aralkyl are preferably phenyl, naphthyl, phenyl-$C_1$–$C_4$-alkyl or naphthyl-$C_1$–$C_4$-alkyl, optionally substituted by halogen or a $C_1$–$C_6$-alkyl, preferably $C_1$–$C_4$-alkyl group and/or a $C_1$–$C_6$-alkoxy, preferably $C_1$–$C_4$-alkoxy, group, $C_1$–$C_{30}$-alkoxy is preferably $C_1$–$C_{16}$-alkoxy, in particular $C_1$–$C_{12}$-alkoxy, $C_1$–$C_{12}$-alkylcarbonyl, $C_1$–$C_{12}$-alkoxycarbonyl and $C_1$–$C_{12}$-(di)alkylaminocarbonyl are preferably $C_1$–$C_8$-alkylcarbonyl, $C_1$–$C_8$-alkoxycarbonyl and $C_1$–$C_8$-(di) alkylaminocarbonyl, $C_8$–$C_{24}$-aralkenyl is preferably phenyl-$C_2$–$C_{16}$-alkenyl or naphthyl-$C_2$–$C_{16}$-alkenyl, in particular phenyl-$C_2$–$C_{12}$-alkenyl or naphthyl-$C_2$–$C_{12}$-alkenyl, $C_1$–$C_6$-(di)alkylamino is preferably $C_1$–$C_4$-(di) alkylamino.

The alkyl substituents in aromatic rings are in particular methyl, ethyl, n- or i-propyl, n-, iso- or tert.-butyl.

The present invention also provides a process for preparing the above-mentioned (co)polymers which contain a repeating structural chain unit of the general formula (1) and/or (2) and optionally repeating units of the general formula (3)

(1)

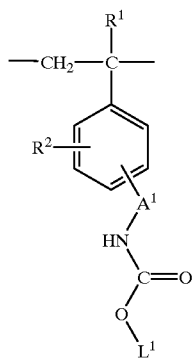

(2)

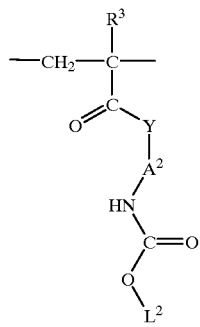

(3)

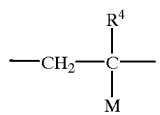

in which $R^1$, $R^2$, $R^3$, $R^4$, M, Y, $A^1$, $A^2$, $L^1$ and $L^2$ have the same meanings as mentioned above and the proportion of structural units of the formula (3) is 0 to 99.5%, preferably 40 to 99.5 mol-%, and the proportion of structural units of the formula (1) or (2) are each 0.5 to 100%, preferably 0.5 to 60 mol-%, and the molar proportions add up to 100%, characterised in that a fluorescent dye of the formula (17), with a functional hydroxy group, $L^1$—OH or $L^2$—OH (17)

wherein $L^1$ and $L^2$ have the meanings given above, is reacted with a (co)polymer which contains a repeating structural chain unit of the general formula (18) and/or (19) and optionally repeating units of the general formula (3)

(18)

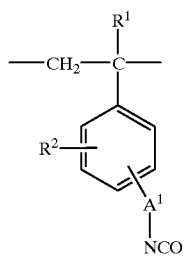

-continued (19)

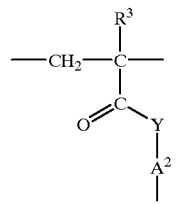

(3)

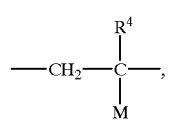

in which $R^1$, $R^2$, $R^3$, $R^4$, M, Y, $A^1$ and $A^2$ have the same meanings as mentioned above and the proportion of structural units of the formula (3) is 0 to 99.5 mol-%, preferably 40 to 99.5 mol-%, and the proportion of structural units of the formula (18) and/or (19) are each 0.5 to 100%, preferably 0.5 to 60 mol-%, and the molar proportions add up to 100%, catalysed by, for example, a tertiary amine such as for example, triethylamine, tributylamine or diazobicyclo-[2.2.2]octane or an organic tin compound such as, for example, dibutyltin oxide or dibutyltin dilaurate, in the presence of a diluent such as, for example, benzene, toluene, xylene, mesitylene, chlorobenzene, tetrahydrofuran, dioxan, ethyl acetate, 1-methoxy-2-propyl acetate, dichloromethane, 1,2-dichloroethane or chloroform, at temperatures of 20 to 250° C., preferably 40 to 150° C.

The (co)polymers mentioned above with repeating structural chain units of the general formulae (18) and/or (19) and optionally with the general formula (3) can be prepared in a polymerisation reaction from monomers (20), (21) and (22), based on the corresponding vinyl units, in which $R^1$ to $R^4$, M, Y, $A^1$ and $A^2$ have the meanings given above.

(20)

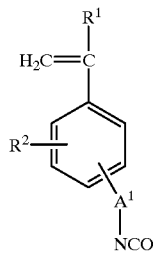

(21)

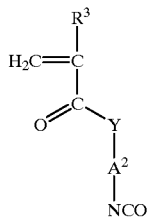

(22)

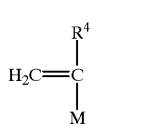

These types of polymerisation processes are described in the literature. They may be performed radically or ionically. Ionic polymerisation can be initiated, for example, by starters such as butyl lithium or lithium naphthalide. Radical polymerisation can be initiated, for example, by radical starters such as e.g azo initiators or peroxides, preferably AIBN (azoisobutyrodinitrile) or dibenzoyl peroxide. The polymers may be prepared in bulk or in suitable solvents such as e.g. benzene, toluene, tetrahydrofuran, dioxan, ethyl acetate, xylene, chlorobenzene, 1-methoxy-2-propyl acetate, chlorinated hydrocarbons, acetone, at temperatures of 20 to 250° C.

The preparation of (co)polymers according to the invention is shown, for example, in the following formula flow scheme:

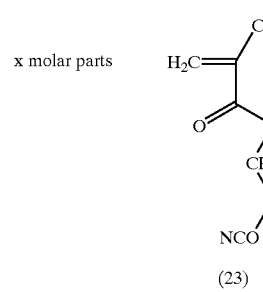

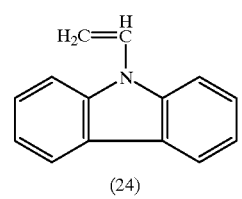

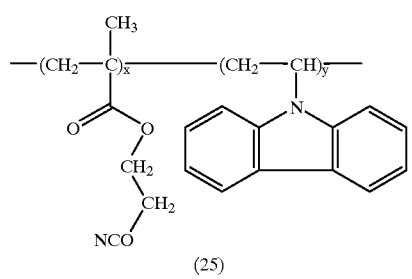

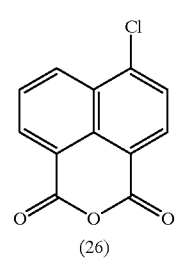

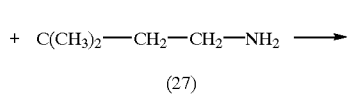

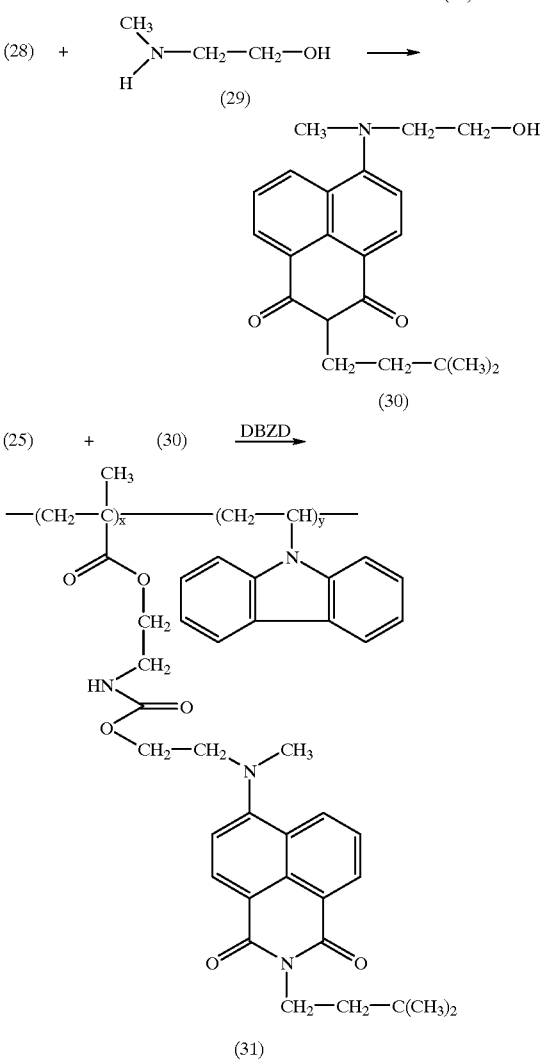

(Co)polymers according to the present invention have molecular weights in the range 1000 to 1 million g/mol, preferably 5,000 to 500,000 g/mol, as determined by gel permeation chromatography.

Some of the hydroxy-functionalised fluorescent dyes (see definition of grouping L) required to prepare (co)polymers according to the invention are known.

Coumarin derivatives of the following formula (4a) are new:

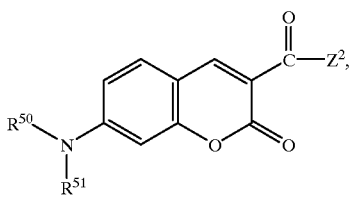

(4a)

wherein $R^{50}$ and $R^{51}$, independently of each other, represent hydrogen or a $C_1$–$C_{30}$-alkyl, $C_6$–$C_{18}$-aryl or $C_6$–$C_{24}$-aralkyl group, each of which may be substituted by hydroxy, amino, carboxy and/or $C_1$–$C_4$-alkoxycarbonyl groups, or $R^{50}$ and $R^{51}$, together with the nitrogen atom to which they are bonded, may represent a morpholine, piperidine, pyrrolidine or piperazine ring which may have one or two substituents from the group comprising methyl, ethyl and phenyl, and $Z^2$ represents a group —$OR^{52}$ or —$NR^{53}R^{54}$, wherein $R^{52}$ represents a $C_1$–$C_{30}$-alkyl, $C_6$–$C_{18}$-aryl or $C_6$–$C_{24}$-aralkyl group, which may each be substituted by at least one hydroxy group, and wherein the aromatic rings may also be substituted by halogen or a $C_1$–$C_6$-alkyl and/or $C_1$–$C_6$-alkoxy group and $R^{53}$ and $R^{54}$, independently of each other, each represent an optionally hydroxy-substituted $C_1$–$C_{30}$-alkyl, $C_6$–$C_{18}$-aryl or $C_6$–$C_{24}$-aralkyl group, wherein at least one of the groups $R^{53}$ and $R^{54}$ has a hydroxy group available and wherein the aromatic rings may also be substituted by halogen or a $C_1$–$C_6$-alkyl and/or $C_1$–$C_6$-alkoxy group.

Coumarin derivatives of the formula (4a) have at least one hydroxy group via which they may be chemically bonded to polymer side chains.

In formula (4a), $R^{50}$ and $R^{51}$, independently of each other, preferably represent hydrogen or a $C_1$–$C_{16}$-alkyl group, optionally substituted by a hydroxy, amino, carboxy and/or $C_1$–$C_4$-alkoxycarbonyl group, or a phenyl, naphthyl, phenyl-$C_1$–$C_4$-alkyl or naphthyl-$C_1$–$C_4$-alkyl group, either unsubstituted or substituted by $C_1$–$C_4$-alkyl, hydroxy, amino, carboxy and/or $C_1$–$C_4$-alkoxycarbonyl, chlorine and/or bromine group.

$R^{50}$ and $R^{51}$ represent in particular an optionally hydroxy, amino and/or carboxy substituted $C_1$–$C_6$-alkyl or phenyl group, $Z^2$ in formula (4a) mentioned above represents —$OR^{52}$ or $NR^{53}R^{54}$, wherein $R^{52}$ preferably represents a $C_1$–$C_{16}$-alkyl, phenyl, naphthyl, phenyl-$C_1$–$C_4$-alkyl or naphthyl-$C_1$–$C_4$-alkyl group, wherein each is substituted by at least one hydroxy group, and wherein the aromatic rings may also be substituted by halogen or a $C_1$–$C_{16}$-alkyl and/or $C_1$–$C_6$-alkoxy group, $R^{53}$ and $R^{54}$, independently of each other, preferably each represent an optionally hydroxy-substituted $C_1$–$C_{16}$-alkyl, phenyl, naphthyl, phenyl-$C_1$–$C_4$-alkyl or naphthyl-$C_1$–$C_4$-alkyl group, wherein at least one of the groupings $R^{53}$ and $R^{54}$ has a hydroxy group available and wherein the aromatic rings may also be substituted by halogen or a $C_1$–$C_6$-alkyl and/or $C_1$–$C_6$-alkoxy group, $R^{52}$ represents in particular a hydroxy-substituted $C_1$–$C_{12}$-alkyl group, $R^{53}$ and $R^{54}$, independently of each other, represent in particular an optionally hydroxy-substituted $C_2$–$C_{12}$-alkyl group, wherein at least one of the groups $R^{53}$ and $R^{54}$ has a hydroxy group available.

Coumarin derivatives of the formula (4a),

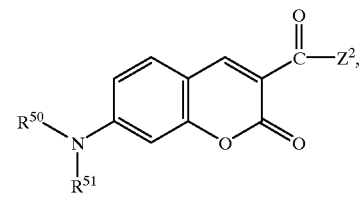

(4a)

wherein $R^{50}$, $R^{51}$ and $Z^2$ have the meanings given above, can be prepared as follows:

a) in the event that $Z^2$ represents —$OR^{52}$, preferably in a one-pot process, the malonic acid derivative of the formula (III)

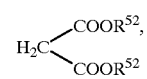

(III)

is prepared from Meldrum's acid of the formula (I)

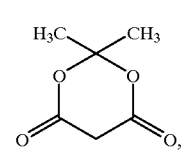

(I)

and an alcohol of the formula (II)

$R^{52}$—OH  (II)

optionally in the presence of a diluent such as, for example, toluene, xylene or mesitylene, catalysed by, for example, p-toluenesulphonic acid at temperatures in the range 20 to 250° C., preferably 80 to 150° C., and this is then reacted with a salicylaldehyde of the formula (IV)

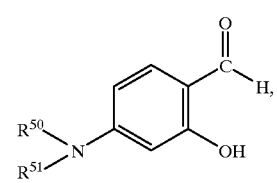

(IV)

wherein $R^{50}$, $R^{51}$ and $R^{52}$ have the meaning given above, optionally in the presence of a diluent, for example toluene, xylene or mesitylene, catalysed by, for example, piperidine acetate at temperatures of 50 to 250° C., preferably 80 to 140° C., and b) in the event that $Z^2$ represents —$NR^{53}R^{54}$, a salicylaldehyde of the formula (IV) is reacted with a secondary amine of the formula (V) and a malonic acid derivative of the formula (VI),

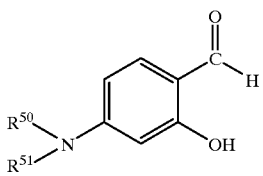 (IV)

 (V)

H$_2$C(COOR$^{55}$)$_2$, (VI)

wherein R$^{50}$, R$^{51}$, R$^{53}$ and R$^{54}$ have the meaning given above and R$^{55}$ represents a C$_1$–C$_6$-alkyl group,
optionally in the presence of a diluent such as, for example, toluene, xylene or mesitylene, catalysed by, for example, piperidine acetate at temperatures of 50 to 250° C., preferably 80 to 140° C.

When performing process a) according to the invention, 2 to 10 moles, preferably 3 to 6 moles, of alcohol of the formula (II) is generally used per mole of compound of the formula (I) and 0.5 to 1 mole, preferably 0.9 to 1 mole, of salicylaldehyde of the formula (IV) is generally used per mole of compound of the formula (III).

When performing process b) according to the invention, 2 to 20 moles, preferably 5 to 10 moles of secondary amine of the formula (V) and 1 to 2 moles, preferably 1.2 to 1.5 moles, of the malonic acid derivative of the formula (VI) are used per mole of compound of the formula (IV).

Preparation of coumarin derivatives of the formula (4a) when Z$^2$=—R$^{52}$ is shown by way of example by the following formula flow scheme, within the context of a Knoevagel condensation and subsequent cyclisation:

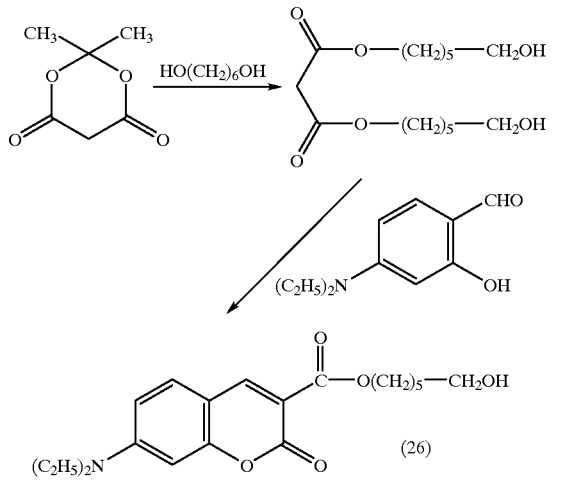

In this case, bis-(6-hydroxyhexyl)-malonate is prepared by reacting Meldrum's acid and 1,6-hexanediol in the presence of catalytic amounts of p-toluenesulphonic acid, with the elimination of acetone and water. Then 4-diethylaminosalicyl-aldehyde is added to the bis-(6-hydroxyhexyl)-malonate in the presence of catalytic amounts of piperidine acetate with formation of the desired 3-(6-hydroxy-hexoxycarbonyl)-7-diethylamino-coumarin.

Preparation of coumarin derivatives of the formula (4a) when Z$^2$=—NR$^{53}$R$^{54}$ is shown by way of example by the following formula flow scheme:

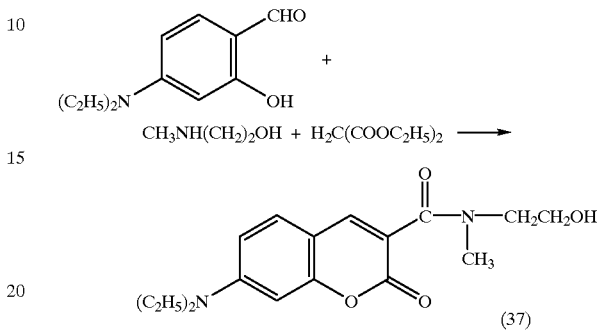

In this case, 4-diethylamino-salicylaldehyde in the presence of catalytic amounts of piperidine acetate is reacted with diethyl malonate and 2-(methylamino)-ethanol.

The desired 3-[(N-hydroxyethyl-N-methyl) aminocarbonyl]-7-diethylamino-coumarin is then obtained.

Starting compounds of the formulae (I), (II), (III), (IV), (V) and (VI) are generally known compounds in organic chemistry.

1,8-naphthalimide derivatives of the following formula (6a), (7a-1) and (7b-1) are also new:

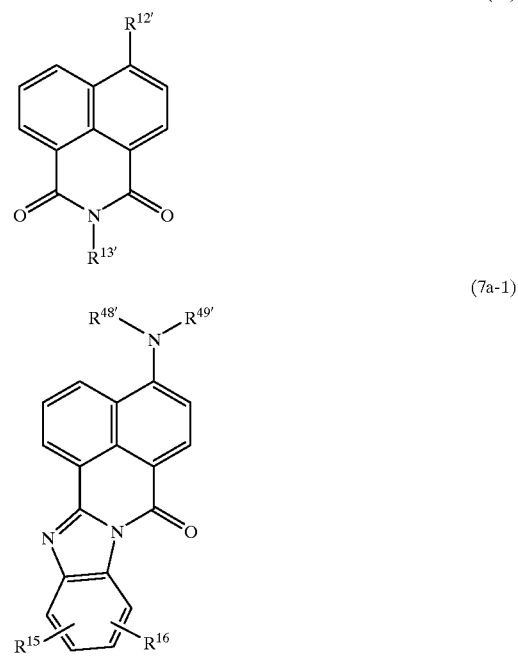

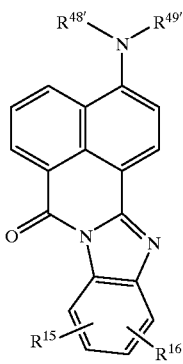

(7b-1)

in which
R$^{12'}$ represents hydrogen, halogen, nitro or a C$_1$–C$_4$-alkoxycarbonyl, C$_1$–C$_4$-acyl or C$_8$–C$_{24}$-aralkenyl group or a non-substituted amino group or an amino group substituted once or twice by identical or different C$_1$–C$_{30}$-alkyl, C$_6$–C$_{18}$-aryl or C$_6$–C$_{24}$-aralkyl groups, wherein the hydrocarbon chains mentioned above may themselves be substituted by a hydroxy group, R$^{12'}$ may also represent a morpholinyl, piperidinyl, pyrrolidinyl or piperazinyl group which may have one or two substituents selected from methyl, ethyl and phenyl, R$^{13'}$ represents hydrogen or a C$_1$–C$_{30}$-alkyl, C$_1$–C$_{30}$-alkoxy, C$_6$–C$_{18}$-aryl or C$_6$–C$_{24}$-aralkyl group, which may be substituted once or several times by hydroxy groups, and at least one of the groups R$^{12'}$ and R$^{13'}$ has a hydroxy group available, R$^{48'}$ and R$^{49'}$, independently of each other, represent a C$_1$–C$_{30}$-alkyl, C$_6$–C$_{18}$-aryl or C$_6$–C$_{24}$-aralkyl group which may be substituted by a hydroxy group, R$^{48'}$ and R$^{49'}$, together with the nitrogen atom to which they are bonded, may also represent a morphinyl, piperidinyl, pyrrolidinyl or piperazinyl group, which may have one or two, identical or different, substituents selected from methyl, ethyl and phenyl, wherein at least one of the groups R$^{48'}$ and R$^{49'}$ has a hydroxy group available and R$^{15}$ and R$^{16}$ have the meaning given above.

1,8-naphthalimide derivatives of the formulae (6a), (7a-1) and (7b-1) have at least one hydroxy group via which they may be chemically bonded to polymer side chains.

In the formula (6a) mentioned above,
R$^{12'}$ preferably represents hydrogen, chlorine, bromine, nitro, methoxycarbonyl, ethoxycarbonyl, n- or iso-propoxycarbonyl, methylcarbonyl, ethylcarbonyl, n- or iso-propylcarbonyl, amino or an amino group in which is substituted once or twice by identical or different C$_1$–C$_{15}$-alkyl groups, each of which is optionally substituted by methyl and/or ethyl, phenyl, naphthyl, phenyl-C$_1$–C$_4$-alkyl, naphthyl-C$_1$–C$_4$-alkyl, wherein the hydrocarbon chains mentioned above may themselves be substituted by a hydroxy group.

R$^{12'}$ also preferably represents a morphinyl, piperidinyl, pyrrolidinyl or piperazinyl group which may have one or two substituents selected from methyl, ethyl and phenyl, R$^{13'}$ preferably represents hydrogen or a C$_1$–C$_{15}$-alkyl, phenyl or phenyl-C$_1$–C$_4$-alkyl group, which may be substituted by a hydroxy group and the aromatic rings may also be substituted by halogen or a C$_1$–C$_6$-alkyl and/or C$_1$–C$_6$-alkoxy group.

R$^{12'}$ represents in particular chlorine, bromine or amino which is substituted by one or two, identical or different C$_1$–C$_{15}$-alkyl groups, morpholinyl, piperidinyl, pyrrolidinyl or piperazinyl, wherein the hydrocarbon chains mentioned above may themselves be substituted by a hydroxy group, R$^{13'}$ represents in particular a C$_1$–C$_{12}$-alkyl, a phenyl group, optionally substituted by halogen or a C$_1$–C$_6$-alkyl and/or C$_1$–C$_6$-alkoxy group, which may have a hydroxy group.

At least one group R$^{12'}$ and R$^{13'}$ must have a hydroxy group available.

R$^{48'}$ and R$^{49'}$ in formulae (7a-1) and (7b-1), independently of each other, preferably represent a C$_1$–C$_{15}$-alkyl, phenyl, naphthyl, phenyl-C$_1$–C$_4$-alkyl, or naphthyl-C$_1$–C$_4$-alkyl group, which may be substituted once or several times, preferably once, by a hydroxy group, R$^{48'}$ and R$^{49'}$ also preferably represent, together with the nitrogen atom to which they are bonded, piperidinyl or piperazinyl which may have one or two, identical or different, substituents selected from methyl, ethyl and phenyl.

At least one of the groups R$^{48'}$ and R$^{49'}$ must have one hydroxy group available.

R$^{15}$ and R$^{16}$ in the formulae (7a-1) and (7b-1), independently of each other, preferably represent hydrogen, halogen or a C$_1$–C$_{15}$-alkyl, C$_1$–C$_{15}$-alkoxy, C$_1$–C$_4$-alkoxycarbonyl, C$_1$–C$_4$-acyl, C$_1$–C$_6$-(di)alkylamino group, each of which may be substituted by methyl and/or ethyl-substituted phenyl, naphthyl, phenyl-C$_1$–C$_6$-alkyl, or naphthyl-C$_1$–C$_6$-alkyl group.

R$^{48'}$ and R$^{49'}$ represent in particular C$_1$–C$_{12}$-alkyl, phenyl or phenyl-C$_1$–C$_6$-alkyl which may be substituted by a hydroxy group, wherein at least one of the groups R$^{48'}$ and R$^{49'}$ must have a hydroxy group available.

R$^{15}$ and R$^{16}$ represent in particular hydrogen, halogen or a C$_1$–C$_{12}$-alkyl, C$_1$–C$_{12}$-alkoxy, C$_1$–C$_6$-(di)alkylamino or phenyl group.

The number of hydroxy groups is at least one, but there may also be up to four hydroxy groups.

The aromatic rings in the groups mentioned above may be substituted once to five times, preferably once to three times, by identical or different substituents, from those mentioned above.

A process for preparing 1,8-naphthalimide derivatives of the formula (6a)

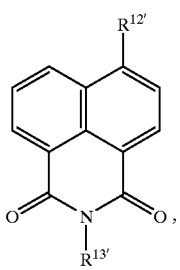

(6a)

wherein R$^{12'}$ and R$^{13'}$ have the meaning given above, is characterised in that either
A) a 1,8-naphthalic anhydride of the formula (VII) and a primary amine of the formula (VIII),

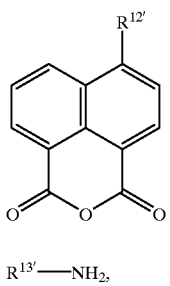

(VII)

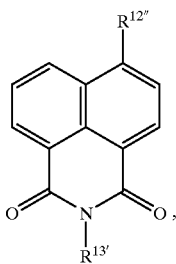

(VIII)

R$^{13'}$—NH$_2$, wherein R$^{12'}$ and R$^{13'}$ have the meaning given above, are reacted together at temperatures of 50 to 250° C., preferably 90 to 140° C., in the presence of a diluent such as, for example, acetic acid, butanol, chlorobenzene, toluene or xylene, or B) in the event that R$^{12'}$ in formula (6a) is a singly or doubly substituted amino group or a cyclic amino group, a 1,8-naphthalimide of the formula (6a-1)

(6a-1)

in which R$^{12''}$ represents a halogen, preferably chlorine, bromine iodine, or nitro and R$^{13'}$ has the meaning given above, is prepared from a 1,8-naphthalic anhydride of the formula (VIIa) and a primary amine of the formula (VIII)

(VII)

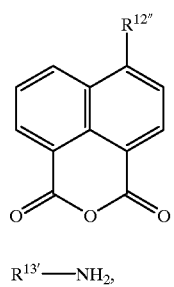

(VIII)

R$^{13'}$—NH$_2$, wherein R$^{12''}$ and R$^{13'}$ have the meaning given above, at temperatures of 50 to 250° C., preferably 90 to 140° C., in the presence of a diluent such as, for example, acetic acid, butanol, chlorobenzene, toluene or xylene, and the compound of the formula (6a-1) obtained in this way is then reacted with a primary or secondary amine or a cyclic secondary amine whose structure corresponds to that of R$^{12'}$, optionally in the presence of a solvent such as, for example, methoxyethanol or butanol, catalysed by, for example, a copper(II) salt at temperatures of 50 to 250° C. preferably 100 to 150° C.

A process for preparing 1,8-naphthalimide derivatives of the formula (7a-1) and (7b-1) (process C)

(7a-1)

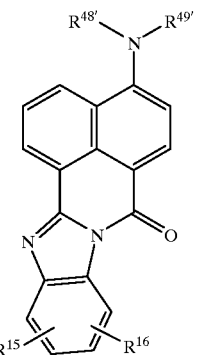

(7b-1)

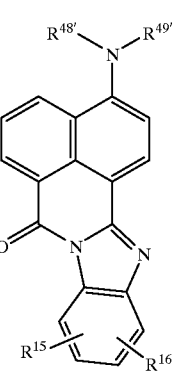

wherein R$^{15}$, R$^{16}$, R$^{48'}$ and R$^{49'}$ have the meaning given above, is characterised in that a 1,8-naphthalimide derivative of the formula (IXa and b), (IXa)

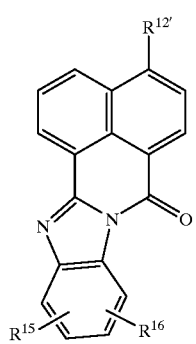

-continued

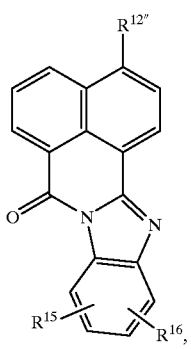
(IXb)

wherein $R^{15}$, $R^{16}$ and $R^{12''}$ have the meaning given above, is prepared from a 1,8-naphthalic anhydride of the formula (VIIa)

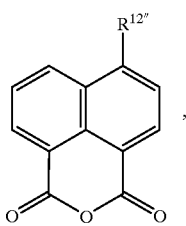
(VIIa)

wherein $R^{12''}$ has the meaning given above, and an o-phenylenediamine of the formula (X)

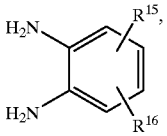
(X)

wherein $R^{15}$ and $R^{16}$ have the meaning given above, at temperatures of 50 to 250° C., preferably 90 to 140° C., in the presence of a diluent such as, for example, acetic acid, butanol, chlorobenzene, toluene or xylene, and the 1,8-naphthalimide derivative of the formula (IXa and b) is then reacted with a secondary amine of the formula (XI)

$$R^{48'}\!\!-\!\!NH\!-\!R^{49'}$$ (XI)

wherein $R^{48'}$ and $R^{49'}$ have the meaning given above, optionally in the presence of a solvent such as, for example, methoxyethanol or butanol, catalysed by, for example, a copper (II) salt at temperatures of 50 to 250° C., preferably 100 to 150° C.

When performing process (A) according to the invention for preparing 1,8-naphthalimide derivatives of the formula (6a), 1 to 1.8 moles, preferably 1.2 to 1.4 moles of primary amine of the formula (VIII) are generally used per mole of compound of the formula (VII).

When performing process (B) according to the invention for preparing 1,8-naphthalimide derivatives of the formula (6a), 1 to 1.8 moles, preferably 1.2 to 1.4 moles of primary amine of the formula (VIII) are generally used per mole of compound of the formula (VIIa) and 1.2 to 5 moles, preferably 2 to 2.5 moles, of the corresponding primary, secondary or cyclic amine are generally used per mole of the compound of the formula (6a-1).

Preparation of 1,8-naphthalimide derivatives of the formula (6a), process (A) and (B), is shown by way of example by the following formula flow scheme:

Here, 4-chloro-N-hydroxyethyl-1,8-naphthalimide is prepared by reacting 4-chloronaphthalic anhydride and 2-aminoethanol. Then piperidine is added to the 4-chloro-N-hydroxyethyl-1,8-naphthalimide in the presence of catalytic amounts of a copper(II) salt with formation of the desired N-hydroxyethyl-4-piperidino-1,8-naphthalimide.

When performing process (C) according to the invention to prepare 1,8-naphthalimide derivatives of the formula (7a-1) and (7b-1), 1 to 1.8 moles, preferably 1.2 to 1.4 moles, of o-phenylenediamine of the formula (X) are generally used per mole of compound of the formula (VIIa) and 1.2 to 5 moles, preferably 2 to 2.5 moles of secondary amine of the formula (XI) are generally used per mole of compound of the formula (IXa and b).

Preparation of 1,8-naphthalimide derivatives of the formulae (7a-1) and (7b-1) (process C) is shown by way of example by the following formula flow scheme:

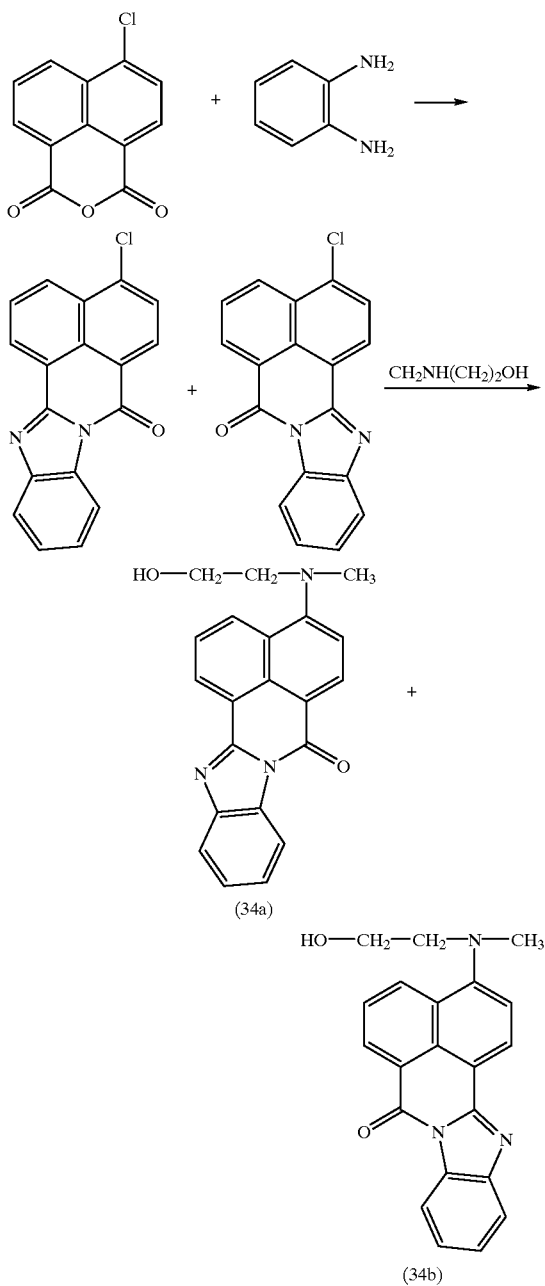

(34a)

(34b)

Here, 4/5-chloro-1,8-naphthoylene-1'2'-benzimidazole, which is formed as an isomeric mixture (about 3:1), is prepared by reacting 4-chloro-naphthalic anhydride and o-phenylenediamine. 2-(methylamino)-ethanol is then added to the 4/5-chloro-1,8-naphthaloylene-1'2'-benzimidazole in the presence of a catalytic amount of a copper(II) salt with formation of the desired 4/5-(N-methyl-N-hydroxyethyl)-amino-1,8-naphthaloylene-1',2'-benzimidazole.

The starting compounds of the formulae (VII), (VIII), (VIIa), (X) and (XI) for preparing 1,8-naphthalimide derivatives of the formulae (6a), (7a-1) and (7b-1) are generally (known) compounds in organic chemistry.

Furthermore, the compounds of the formulae (20), (21) and (22) required for preparing (co)polymers according to the invention are generally known compounds.

(Co)polymers according to the present invention are distinguished by their luminescent properties and ability to form films and can be applied to suitable substrates by pouring, spreading or spin-coating. The products exhibit photoluminescence when irradiated both in solution and also as films. (Co)polymers according to the present invention are suitable for constructing electroluminescent displays.

As a result of the structures and methods of preparation of (co)polymers according to the invention, the light-emitting intensity can be specifically altered by varying the concentration of luminophore, the colour shades can be affected by incorporating luminophores with different emission spectra and the morphology and electrical properties of the polymeric layers can be optimised by introducing other suitable building blocks.

The invention therefore relates to use of the polymers and copolymers described above in the luminescent layer of an electroluminescent devices which is characterised in that an electroluminescent layer is located between two electrodes, that at least one of the two electrodes is transparent in the visible region of the spectrum, that light in the frequency range 200 to 2000 nm is emitted when applying a direct voltage in the range from 0.1 to 100 volts, that in addition one or more intermediate layers may be arranged between the electroluminescent layer and the electrodes.

These intermediate layers are known from the literature (see Adachi et al., Appl. Phys. Lett., 57, 531 (1990)) and are referred to there as HTL (hole transport layer) and ETL (electron transport layer). The purpose of these intermediate layers is, inter alia, to increase the intensity of electroluminescence.

Electroluminescent polymers according to the invention, however, may also be used in the electroluminescent layer as a mixture with each other or with at least one other material. These other materials may be
1. inert binders
2. charge carrier transfer substances such as are described in EP-A 532 798 or EP-A 564 224
3. mixtures of inert binders and charge carrier transfer substances.

The mixtures of polymers according to the invention and another material are distinguished, inter alia, in that they are film-producing and can be applied over large surface areas on suitable substrates by pouring, spreading or spin-coating. Suitable substrates are transparent supports such as glass or plastic sheets (e.g. polyester, such as polyethylene terephthalate or polyethylene naphthalate, polycarbonate, polysulphone or polyimide sheets).

The inert binders are preferably soluble, transparent polymers such as e.g. polycarbonates, polystyrene, polyvinylpyridine, polymethylphenylsiloxane and copolymers of polystyrene such as SAN, polysulphones, polyacrylates, polyvinylcarbazole or polymers and copolymers of vinyl acetate and vinyl alcohol.

EXAMPLE

1) Preparation of Copolymer in Accordance with Formula (25)

(x:y=0.5:0.5) as a 50% strength solution in 1-methoxy-2-propyl acetate

A solution of 15.5 g (0.10 mol) of 2-isocyanatoethyl-methacrylate, 19.3 g (0.10 mol) of N-vinylcarbazole, 0.32 g (2.0 mmol) of AIBN in 35 g of dried 1-methoxy-2-propyl acetate is added dropwise, under nitrogen, with stirring, into a three-necked flask heated to 110° C., over the course of 3 h. AIBN (a total of 0.32 g) is added several times to the polymerisation mixture at the same temperature, over the course of 16 h. A colourless high-viscosity solution is obtained.

2) 4-chloro-N-isoamyl-1,8-naphthalimide in Accordance with Formula (28)

A mixture of 46.6 g (0.20 mol) of 4-chloro-1,8-naphthalic anhydride, 21 g (0.24 mol) of isoamylamine and 250 ml of acetic acid is stirred for 2 h under reflux. The solution is cooled to room temperature and then 1 l of water is added. The suspension is filtered and, after drying, 60 g (96% of theoretical) of pale yellow crystals with a melting point of 132.5 to 134.5° C. are obtained.

3) N-isoamyl-4-(N'-methyl-N'-hydroxyethyl)amino-1,8-naphthalimide in Accordance with Formula (30)

A mixture of 30.0 g (0.1 mol) of 4-chloro-N-isoamyl-1,8-naphthalimide (28), 50 ml of 2-(methylamino)-ethanol, 3.0 g of copper(II) sulphate and 150 ml of ethylene glycol monomethyl ether is stirred for 2.5 h under reflux. The solution is cooled to room temperature and then 1 l of water is added. The suspension is extracted with dichloromethane. The organic phase is concentrated by evaporation and the residue is recrystallised from toluene. 24.5 g (71% of theoretical) of yellow crystals with a melting point of 117 to 118° C. are obtained.

4) Preparation of Copolymer in Accordance with Formula (31)

(x:y=0.5:0.5)

2 mg of dibutyltin dilaurate is added, under nitrogen, to a mixture of 3.5 g (about 5 mmol of NCO groups) of a 50% strength solution of copolymer in accordance with formula (25) (x:y=0.5:0.5) in 1-methoxy-2-propyl acetate, 1.7 g (5.0 mmol) of N-isoamyl-4-(N'-methyl-N'-hydroxyethyl)amino-1,8-naphthalimide of the formula (30) and 15 ml of anhydrous 1-methoxy-2-propyl acetate. The reaction mixture is stirred at 110° C., wherein the relative amounts of bonded and free dye is constantly checked by thin layer chromatography, until no obvious changes can be observed. The resulting viscous solution is precipitated from methanol, after cooling. 3.2 g (93% of theoretical) of a pale yellow, fluorescent solid are obtained.

5) Preparation of the Electroluminescent Device from copolymer (31) (x:y=0.5:0.5)

ITO-coated glass (produced by the Balzers Co.) is cut into 20×30 mm sized substrates and cleaned. For this, the following steps are performed in succession:
1. rinse in an ultrasound bath for 15 min with distilled water and Falterol,
2. rinse in an ultrasound bath for 2×15 min using fresh distilled water each time,
3. rinse with ethanol for 15 min in an ultrasound bath,
4. rinse for 2×15 min in an ultrasound bath, using fresh acetone each time,
5. dry on fluff-free optical tissues.

A 1% strength solution of polymer in accordance with formula (31) (x:y=0.5:0.5) in 1,2-dichloroethane is filtered (0.2 μm filter, Sartorius Co.). The filtered solution is distributed over the ITO glass with a lacquer centrifuge applier at 1000 rpm.

Al electrodes are then vapour-deposited onto the film produced in this way. To this end, isolated Al dots with a diameter of 3 mm are vapour deposited onto the film, using a perforated mask. During the vapour deposition procedure, a pressure of less than $10^{-5}$ bar was maintained in a vapour deposition apparatus (Leybold).

The ITO layer and the Al electrodes are then connected to a voltage source via electrical wiring. On increasing the voltage, an electric current flows through the device and the layer described electroluminesces in the yellow-green region of the spectrum. Electroluminescence occurs independently of the polarity of the applied voltage.

What is claimed is:

1. A copolymer comprising at least one repeating structural chain unit of the formulas (1) and/or (2), and optionally, a repeating structural chain unit of the formula (3):

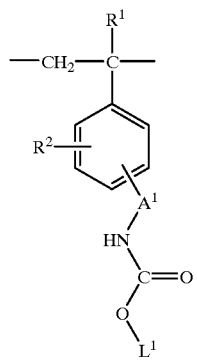

(1)

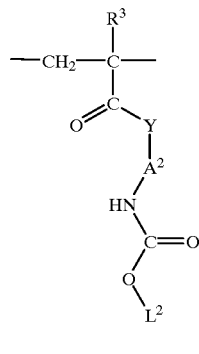

(2)

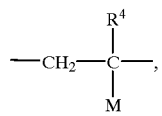

(3)

in which $R^1$, $R^3$ and $R^4$, independently of each other, represent hydrogen or a $C_1$–$C_6$-alkyl group, $R^2$ represents hydrogen or a $C_1$–$C_{30}$-alkyl, $C_6$–$C_{18}$-aryl or $C_1$–$C_{30}$-alkoxy group, M represents CN or a $C_1$–$C_{30}$-alkoxycarbonyl, $C_1$–$C_{30}$-(di)alkylaminocarbonyl or $C_1$–$C_{30}$-alkylcarbonyl group, each of which is optionally substituted by a hydroxy and/or $C_1$–$C_6$-alkoxycarbonyl group, or M represents a phenyl, naphthyl, antharcenyl, pyridinyl or carbozolyl group, each of which is optionally substituted by a halogen or a hydroxy, silyl, $C_1$–$C_{30}$-alkyl, $C_6$–$C_8$-aryl, $C_1$–$C_{30}$-alkoxy, $C_1$–$C_{30}$-alkoxycarbonyl, $C_1$–$C_{30}$-acyloxy or $C_1$–$C_{30}$-alkylcarbonyl group, Y represents oxygen, sulphur or —NR°—, wherein R° represents hydrogen or a $C_1$–$C_6$-alkyl group, $A^1$ and $A^2$, independently of each other, represent a $C_6$–$C_{18}$-arylene or $C_1$–$C_{30}$-alkylene group whose aliphatic carbon chain is optionally interrupted by one to three heteroatoms and/or by one to two phenylenes or naphthylenes, the phenylenes or naphthylenes being optionally substituted by a $C_1$–$C_6$-alkyl group, and $L^1$ and $L^2$, independently of each other, are based on a structural skeleton of a fluorescent dye selected from the group of photoluminescent compounds consisting of:

coumarins of the formula (4):

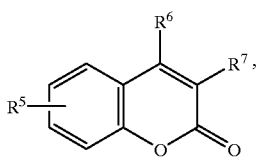

(4)

1,8-naphthalimides of the formula (6):

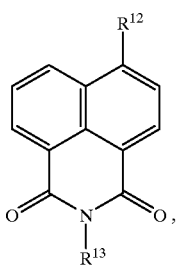

(6)

1,8-naphthaloylene-1',2'-benzimidazloes of the formulas (7a) and (7b):

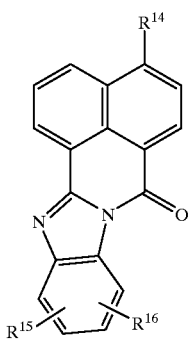

(7a)

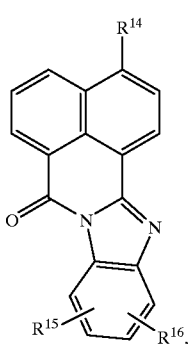

(7b)

phenothiazines or phenoxazines of the formula (8):

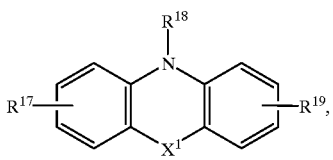

(8)

$X^1$ represents O or S, benzopyrenes of the formula (9):

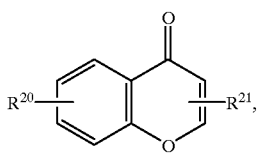

(9)

fluorenes, dibenzothiophenes or dibenzofuranes of the formula (10):

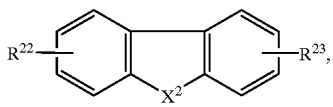

(10)

$X^2$ represents $CH_2$, S or O, oxazoles, 1,3,4-oxadiazoles or 1,2,4-triazoles of the (11):

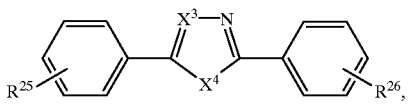

(11)

$X^3$ represents CH or N and $X^4$ represents O, or $X^3$ represents N and $X^4$ represents

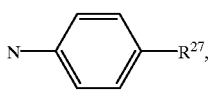

benzoquinolines of the formula (12):

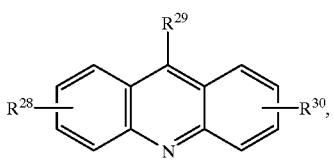

(12)

9,10-bis-(phenylethynyl)-anthracenes of the formula (13):

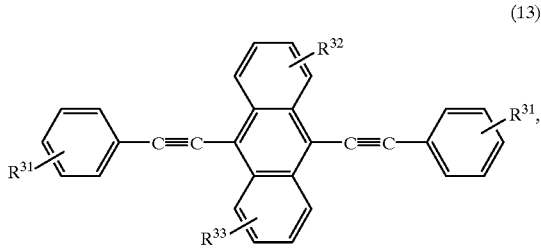

(13)

fluorones of the formula (14):

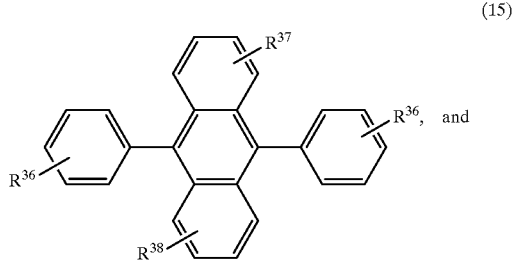

(14)

9,10-diphenylanthracenes of the formula (15):

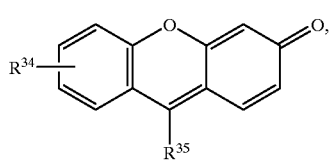

(15)

and 2-styrylbenzazoles of the formula (16):

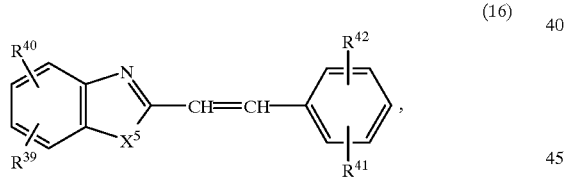

(16)

$X^5$ represents O, S, Se or $CH_2$,
wherein
$R^5$ represents hydrogen or a $C_1$–$C_{30}$-alkyl, $C_6$–$C_{18}$-aryl or $C_7$–$C_{24}$-aralkyl group, or —$NR^{43}R^{44}$, wherein
$R^{43}$ and $R^{44}$, independently of each other, represent a $C_1$–$C_{30}$-alkyl, $C_6$–$C_{18}$-aryl or $C_7$–$C_{24}$-aralkyl group, or together with the nitrogen atom to which they are bonded represent a morpholine, piperidine, pyrrolidine or piperazine ring, which is optionally substituted by one or two substituents selected from the set consisting of methyl, ethyl and phenyl groups,
$R^6$ represents hydrogen or a cyano, $C_1$–$C_{30}$-alkyl, $C_6$–$C_{18}$-aryl or $C_7$–$C_{24}$-aralkyl, $C_1$–$C_{30}$-alkoxy, $C_1$–$C_{12}$-alkylcarbonyl, $C_1$–$C_{12}$-alkoxycarbonyl or $C_1$–$C_{12}$-(di)alkylaminocarbonyl group,
$R^7$ represents hydrogen or a cyano, $C_1$–$C_{30}$-alkyl, $C_6$–$C_{18}$-aryl, $C_7$–$C_{24}$-aralkyl or $C_1$–$C_{30}$-alkoxy group, or

wherein
$Z^1$ represents $OR^{45}$ or

and
$R^{45}$, $R^{46}$ and $R^{47}$, independently of each other, represent a $C_1$–$C_{30}$-alkyl, $C_6$–$C_{18}$-aryl or $C_7$–$C_{24}$-aralkyl group, wherein the aromatic rings are optionally substituted by halogen or a $C_1$–$C_6$-alkyl and/or $C_1$–$C_6$-alkoxy group,
$R^{12}$ represents hydrogen, halogen or a nitro, $C_1$–$C_4$-alkylcarbonyl, $C_1$–$C_4$-alkoxycarbonyl or $C_8$–$C_{24}$-aralkenyl group, or an amino group optionally substituted once or twice by identical or different $C_1$–$C_{30}$-alkyl, $C_6$–$C_{18}$-aryl or $C_7$–$C_{24}$-aralkyl groups, or
$R^{12}$ represents morpholinyl, piperidinyl, pyrrolidinyl or piperazinyl, optionally substituted by one or two substituents selected from the set consisting of methyl, ethyl and phenyl groups,
$R^{13}$ represents hydrogen or a $C_1$–$C_{30}$-alkyl, $C_6$–$C_{18}$-aryl, $C_7$–$C_{24}$-aralkyl or $C_1$–$C_{30}$-alkoxy group,
$R^{14}$ represents hydrogen or a $C_1$–$C_{30}$-alkyl, $C_6$–$C_{18}$-aryl, $C_7$–$C_{24}$-aralkyl or $C_1$–$C_{30}$-alkoxy group, or —$NR^{48}R^{49}$, wherein
$R^{48}$ and $R^{49}$, independently of each other, represent a $C_1$–$C_{30}$-alkyl, $C_6$–$C_{18}$-aryl or $C_7$–$C_{24}$-aralkyl group, or together with the nitrogen atom to which they are bonded represent a morpholine, piperidine, pyrrolidine or piperazine ring, optionally substituted by one or two substituents selected from the set consisting of methyl, ethyl and phenyl groups,
$R^{15}$ and $R^{16}$, independently of each other, represent hydrogen, halogen or a nitro, $C_1$–$C_{30}$-alkyl, $C_6$–$C_{18}$-aryl or $C_7$–$C_{24}$-aralkyl, $C_1$–$C_{12}$-alkylcarbonyl, $C_1$–$C_{12}$-alkoxycarbonyl, $C_1$–$C_{30}$-alkoxy, $C_1$–$C_{12}$-(di)alkylaminocarbonyl or $C_1$–$C_6$-(di)alkylamino group,
$R^{18}$ represents hydrogen or a $C_1$–$C_{30}$-alkyl, $C_6$–$C_{18}$-aryl or $C_7$–$C_{24}$-aralkyl group,
$R^{17}$, $R^{19}$ to $R^{23}$ and $R^{25}$ to $R^{42}$, independently of each other, represent hydrogen or a cyano, $C_1$–$C_{30}$-alkyl, $C_6$–$C_{18}$-aryl, $C_7$–$C_{24}$-aralkyl, amino, $C_1$–$C_{12}$-alkylcarbonyl, $C_1$–$C_{12}$-alkoxycarbonyl, $C_1$–$C_{30}$-alkoxy, $C_1$–$C_{12}$-(di)alkylaminocarbonyl or $C_1$–$C_6$-(di)alkylamino group,
wherein at least one hydroxy group is located on an aliphatic carbon chain or on an aromatic ring in a substituent of $R^5$ to $R^7$, $R^{12}$ to $R^{23}$, and $R^{25}$ to $R^{42}$, and a linkage of the photoluminescent compound to a side chain of the copolymer takes place by a reaction of the at least one hydroxy group with an isocyanate group on the $A^1$ or $A^2$ group with formation of an urethane group having the formula: —NH—COO—, wherein a molar proportion of the repeating structural chain unit of the formula (3) is from 0 to 99.5 mol-%, a molar proportion of each of the at least one structural chain unit of the formulas (1) and/or (2) is from 0.5 to 100 mol-%, and a sum of the molar proportions is 100%, and wherein a compound of the formula (A):

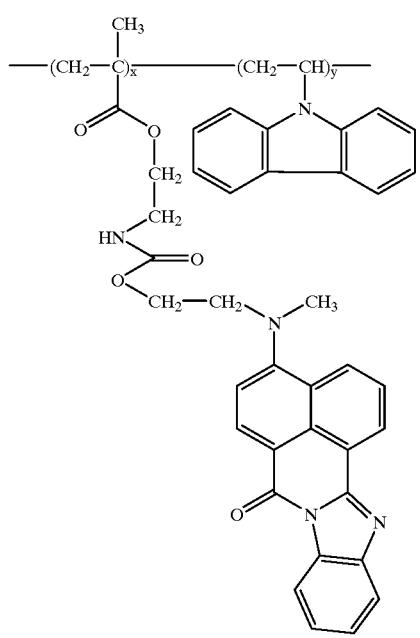

(A)

is excepted.

2. The copolymer according to claim 1, wherein $R^1$, $R^3$ and $R^4$, independently of each other, represent the hydrogen, or a methyl or ethyl group, $R^2$ represents the hydrogen, a $C_1$–$C_6$-alkyl group or a phenyl group, optionally substituted by a methyl, ethyl, n-propyl and/or isopropyl group, M represents CN or a $C_1$–$C_{15}$-alkoxycarbonyl, $C_1$–$C_{15}$-(di)alkylaminocarbonyl or $C_1$–$C_{15}$-alkylcarbonyl group, each of which is optionally substituted by a hydroxy, methoxycarbonyl, ethoxycarbonyl, n-propoxycarbonyl and/or i-propoxycarbonyl group, or M represents the phenyl, naphthyl, anthracenyl, pyridinyl or carbazolyl group, each of which is optionally substituted by the halogen, or the hydroxy or silyl group, or a $C_1$–$C_6$-alkyl, $C_1$–$C_6$-alkoxy, $C_1$–$C_6$-alkoxycarbonyl, $C_1$–$C_6$-acyloxy or $C_1$–$C_6$-alkylcarbonyl group, or a phenyl group, optionally substituted by a methyl, ethyl, n-propyl and/or isopropyl group, Y represents the oxygen, the sulphur or —$NR^0$—, wherein $R^0$ represents the hydrogen or a $C_1$–$C_4$-alkyl group, $A^1$ and $A^2$, independently of each other,
represent a $C_6$–$C_{12}$-arylene or $C_1$–$C_{12}$-alkylene group whose aliphatic carbon chain is optionally interrupted by the one to three heteroatoms and/or by the one to two phenylenes or naphthylenes, the phenylenes or naphthylenes being optionally substituted by the $C_1$–$C_6$-alkyl group, $L^1$ and $L^2$, independently of each other,
are based on the structural skeleton of the fluorescent dye selected from the group of photoluminescent compounds consisting of: the coumarins of the formula (4), the 1,8-naphthylimides of the formula (6), the 1,8-naphthaloylene-1',2'-benzimidazoles of the formulas (7), (7a) and (7b), the phenothiazines or phenoxazines of the formula (8) and the fluorenes of the formula (10).

3. A process for preparing the copolymer according to claim 1, comprising:

reacting a fluorescent dye of the formula (17) having a functional hydroxy group: $L^1$—OH or $L^2$—OH (17), wherein $L^1$ and $L^2$ are defined above, with a copolymer containing at least one repeating structural chain unit of the formulas (18) and/or (19), and optionally, a repeating structural chain unit of the formula (3):

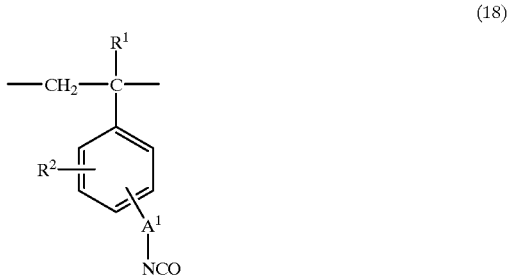

(18)

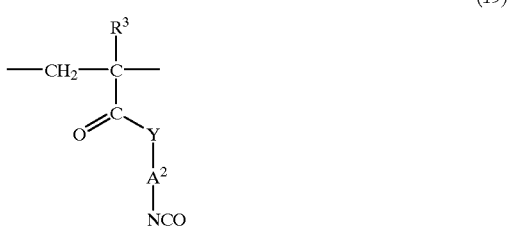

(19)

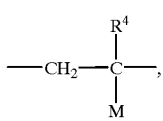

(3)

in which $R^1$, $R^2$, $R^3$, $R^4$, M, Y, $A^1$ and $A^2$ are defined above, and a molar proportion of the repeating structural chain unit of the formulas (3) is from 0 to 99.5 mol-%, a molar proportion of each of the at least one repeating structural chain unit of the formulas (18) and/or (19) is from 0.5 to 100%, and a sum of the molar proportions is 100%, in the presence of a catalyst and a diluent at a temperature of from 20 to 250° C.

4. An electroluminescent device comprising an electroluminescent layer comprising the copolymer according to claim 1, wherein the electroluminescent layer is located between two electrodes, at least one of two electrodes is transparent in a visible region of a spectrum, light in a frequency range of from 200 to 2000 nm is emitted on applying a direct voltage in the range of from 0.1 to 100 volts, and at least one intermediate layer is optionally arranged between the electroluminescent layer and the two electrodes.

5. An electroluminescent device comprising an electroluminescent substance comprising the copolymer according to claim 1.

6. The copolymer according to claim 1, wherein the molar proportion of the repeating structural chain unit of the formula (3) is from 40 to 99.5 mol-% and the molar proportion of each of the at least one repeating structural chain unit of the formulas (1) and/or (2) is from 0.5 to 60 mol-%.

7. The process according to claim 3, wherein the molar proportion of the repeating structural chain unit of the formula (3) is from 40 to 99.5 mol-% and the molar proportion of each of the at least one repeating structural chain unit of the formulas (18) and/or (19) is from 0.5 to 60 mol-%.

8. The process according to claim 3, wherein the catalyst is a tertiary amine, diazobicyclo-[2.2.2]octane or an organic tin compound.

9. The process according to claim 8, wherein the tertiary amine is triethylamine or tributylamine.

10. The process according to claim 8, wherein the organic tin compound is dibutyltin oxide or dibutyltin dilaurate.

11. The process according to claim 3, wherein the diluent is benzene, toluene, xylene, mesitylene, chlorobenzene, tetrahydrofuran, dioxan, ethyl acetate, 1-methoxy-2-propyl acetate, dichloromethane, 1,2-dichloroethane or chloroform.

12. The process according to claim 3, wherein the temperature is from 40 to 150° C.

13. The electroluminescent device according to claim 4, wherein the at least one intermediate layer is a hole transport or electron transport layer.

14. The electrolumnescent device according to claim 4, wherein the electroluminescent layer comprises a mixture of at least two copolymers according to claim 2 or a mixture of at least one copolymer according to claim 2 and at least one of an inert binder and a charge carrer transfer substance.

15. The electroluminescent device according to claim 14, wherein the inert binder is a polycarbonate, a polystyrene, a polyvinylpyridine, a polymethylphenylsiloxane, a copolymer of polystyrene, a polysulphone, a polyacrylate, a polyvinylcarbazole, or a polymer or copolymer of vinyl acetate, or a vinyl alcohol.

16. An electroluminescent apparatus comprising the electroluminescent device according to claim 14, wherein the electroluminescent layer is applied to a transparent support.

17. A copolymer comprising at least one repeating structural chain unit of the formulas (1) and/or (2), and optionally, a repeating structural chain unit of the formula (3):

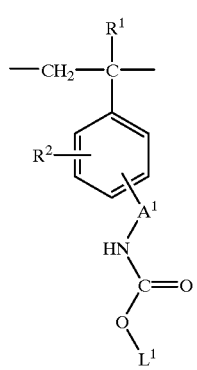

(1)

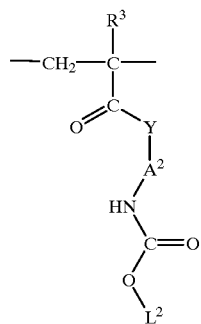

(2)

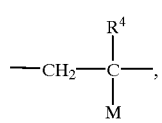

(3)

in which

R$^1$, R$^3$ and R$^4$, independently of each other, represent hydrogen, or a methyl or ethyl group, R$^2$ represents hydrogen, a C$_1$–C$_6$-alkyl group or a phenyl group, optionally substituted by a methyl, ethyl, n-propyl and/or isopropyl group, M represents CN or a C$_1$–C$_{15}$-alkoxycarbonyl, C$_1$–C$_{15}$-(di)alkylaminocarbonyl or C$_1$–C$_{15}$-alkylcarbonyl group, each of which is optionally substituted by a hydroxy, methoxycarbonyl, ethoxycarbonyl, n-propoxycarbonyl and/or i-propoxycarbonyl group, or M represents a phenyl, naphthyl, anthracenyl, pyridinyl or carbazolyl group, each of which is optionally substituted by a halogen or a hydroxy, silyl, C$_1$–C$_6$-alkyl, C$_1$–C$_6$-alkoxy, C$_1$–C$_6$-alkoxycarbonyl, C$_1$–C$_6$-acyloxy or C$_1$–C$_6$-alkylcarbonyl group, or a phenyl group, optionally substituted by a methyl, ethyl, n-propyl and/or isopropyl group, Y represents oxygen, sulphur or —NR$^0$—, wherein 969 R$^0$ represents hydrogen or a C$_1$–C$_4$-alkyl group, A$^1$ and A$^2$, independently of each other,
represent a C$_6$–C$_{12}$-arylene or C$_1$–C$_{12}$-alkylene group whose aliphatic carbon chain is optionally interrupted by one to three heteroatoms and/or by one to two phenylenes or naphthylenes, the phenylenes or naphthylenes being optionally substituted by a C$_1$–C$_6$-alkyl group, L$^1$ and L$^2$, independently of each other, are based on a structural skeleton of a fluorescent dye selected from the group of photoluminescent compounds consisting of:

coumarins of the formula (4):

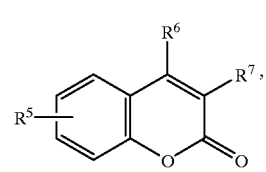

(4)

1,8-naphthalimides of the formula (6):

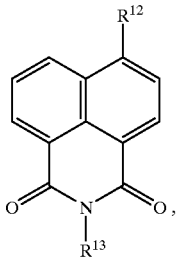
(6)

1,8-naphthaloylene-1',2'-benzimidazloes of the formulas (7a) or (7b),

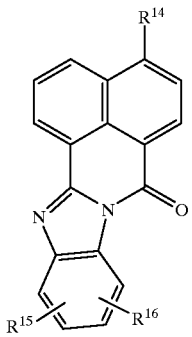
(7a)

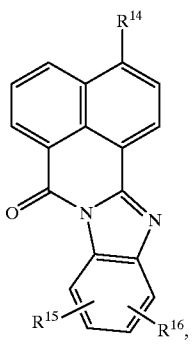
(7b)

phenothiazines or phenoxazines of the formula (8):

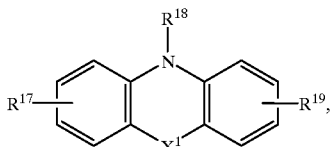
(8)

$X^1$ represents O or S, and fluorenes of the formula (10):

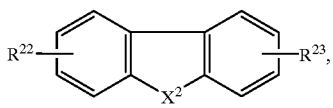
(10)

$X^2$ represents $CH_2$, wherein
$R^5$ represents hydrogen or a $C_1$–$C_{30}$-alkyl, $C_6$–$C_{18}$-aryl or $C_7$–$C_{24}$-aralkyl group, or —$NR^{43}R^{44}$, wherein
$R^{43}$ and $R^{44}$, independently of each other, represent a $C_1$–$C_{30}$-alkyl, $C_6$–$C_{18}$-aryl or $C_7$–$C_{24}$-aralkyl group, or together with the nitrogen atom to which they are bonded represent a morpholine, piperidine, pyrrolidine or piperazine ring, which is optionally substituted by one or two substituents selected from the set consisting of methyl, ethyl and phenyl groups,
$R^6$ represents hydrogen or a cyano, $C_1$–$C_{30}$-alkyl, $C_6$–$C_{18}$-aryl or $C_7$–$C_{24}$-aralkyl, $C_1$–$C_{30}$-alkoxy, $C_1$–$C_{12}$-alkylcarbonyl, $C_1$–$C_{12}$-alkoxycarbonyl or $C_1$–$C_{12}$-(di)alkylaminocarbonyl group,
$R^7$ represents hydrogen or a cyano, $C_1$–$C_{30}$-alkyl, $C_6$–$C_{18}$-aryl, $C_7$–$C_{24}$-aralkyl or $C_1$–$C_{30}$-alkoxy group, or

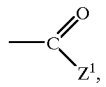

wherein
$Z^1$ represents $OR^{45}$ or

and
$R^{45}$, $R^{46}$ and $R^{47}$, independently of each other, represent a $C_1$–$C_{30}$-alkyl, $C_6$–$C_{18}$-aryl or $C_1$–$C_{24}$-aralkyl group, wherein the aromatic rings are optionally substituted by halogen or a $C_1$–$C_6$-alkyl and/or $C_1$–$C_6$-alkoxy group,
$R^{12}$ represents hydrogen, halogen or a nitro, $C_1$–$C_4$-alkylcarbonyl, $C_1$–$C_4$-alkoxycarbonyl or $C_8$–$C_{24}$-aralkenyl group, or an amino group optionally substituted once or twice by identical or different $C_1$–$C_{30}$-alkyl, $C_6$–$C_{18}$-aryl or $C_7$–$C_{24}$-aralkyl groups, or
$R^{12}$ represents morpholinyl, piperidinyl, pyrrolidinyl or piperazinyl, optionally substituted by one or two substituents selected from the set consisting of methyl, ethyl and phenyl groups,
$R^{13}$ represents hydrogen or a $C_1$–$C_{30}$-alkyl, $C_6$–$C_{18}$-aryl, $C_7$–$C_{24}$-aralkyl or $C_1$–$C_{30}$-alkoxy group,
$R^{14}$ represents hydrogen or a $C_1$–$C_{30}$-alkyl, $C_6$–$C_{18}$-aryl, $C_7$–$C_{24}$-aralkyl or $C_1$–$C_{30}$-alkoxy group, or —$NR^{48}R^{49}$, wherein R[48] and R[49], independently of each other, represent a $C_1-C_{30}$-alkyl, $C_6-C_{18}$-aryl or $C_7-C_{24}$-aralkyl group, or together with the nitrogen atom to which they are bonded represent a morpholine, piperidine, pyrrolidine or piperazine ring, optionally substituted by one or two substituents selected from the set consisting of methyl, ethyl and phenyl groups, R[15] and R[16], independently of each other, represent hydrogen, halogen or a nitro, $C_1-C_{30}$-alkyl, $C_6-C_{18}$-aryl or $C_7-C_{24}$-aralkyl, $C_1-C_{12}$-alkylcarbonyl, $C_1-C_{12}$-alkoxycarbonyl, $C_1-C_{30}$-alkoxy, $C_1-C_{12}$-(di)alkylaminocarbonyl or $C_1-C_6$-(di)alkylamino group, R[18] represents hydrogen or a $C_1-C_{30}$-alkyl, $C_6-C_{18}$-aryl or $C_7-C_{24}$-aralkyl group, R[17], R[19], R[22] and R[23], independently of each other, represent hydrogen or a cyano, $C_1-C_{30}$-alkyl, $C_6-C_{18}$-aryl, $C_7-C_{24}$-aralkyl, amino, $C_1-C_{12}$-alkylcarbonyl, $C_1-C_{12}$-alkoxycarbonyl, $C_1-C_{30}$-alkoxy, $C_1-C_{12}$-(di)alkylaminocarbonyl or $C_1-C_6$-(di)alkylamino group, wherein at least one hydroxy group is located on an aliphatic carbon chain or on an aromatic ring in a substituent of R[5] to R[7], R[12] to R[19] and R[22] to R[23], and a linkage of the photoluminescent compound to a side chain of the copolymer takes place by a reaction of the at least one hydroxy group with an isocyanate group on the A[1] or A[2] group with formation of an urethane group having the formula: —NH—COO—, wherein a molar proportion of the repeating structural chain unit of the formula (3) is from 0 to 99.5 mol-%, a molar proportion of each of the at least one repeating structural chain unit of the formulas (1) and/or (2) is from 0.5 to 100 mol-%, and a sum of the molar proportions is 100%, and wherein a compound of the formula (A):

(A)

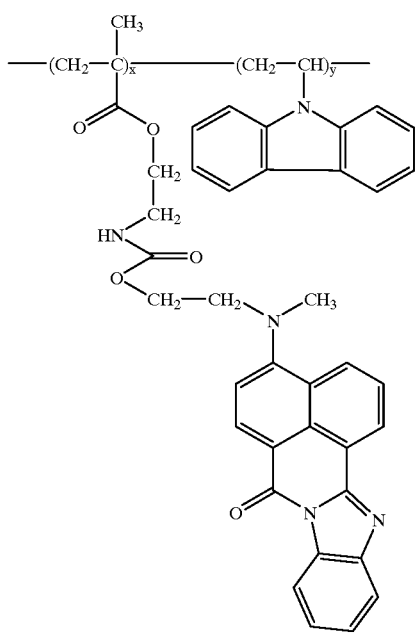

is excepted.

18. A copolymer comprising at least one repeating structural chain unit of the formulas (1) and/or (2), and optionally a repeating structural chain unit of the formula (3): ,

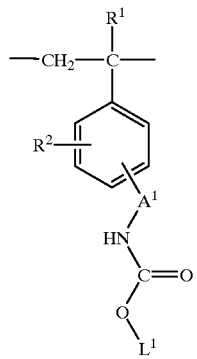

(1)

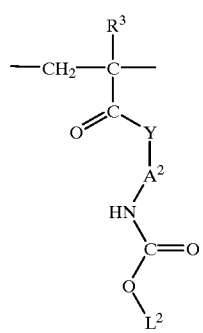

(2)

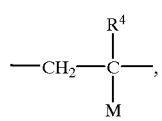

(3)

in which

R[1], R[3] and R[4], independently of each other, represent hydrogen or a $C_1-C_6$-alkyl group, R[2] represents hydrogen or a $C_1-C_{30}$-alkyl, $C_6-C_{18}$-aryl or $C_1-C_{30}$-alkoxy group, M represents CN or a $C_1-C_{30}$-alkoxycarbonyl, $C_1-C_{30}$-(di)alkylaminocarbonyl or $C_1-C_{30}$-alkylcarbonyl group, each of which is optionally substituted by a hydroxy and/or $C_1-C_6$-alkoxycarbonyl group, or M represents a phenyl, naphthyl, antharcenyl, pyridinyl or carbozolyl group, each of which is optionally substituted by a halogen or a hydroxy, silyl, $C_1-C_{30}$-alkyl, $C_6-C_8$-aryl, $C_1-C_{30}$-alkoxy, $C_1-C_{30}$-alkoxycarbonyl, $C_1-C_{30}$-acyloxy or $C_1-C_{30}$-alkylcarbonyl group, Y represents oxygen, sulphur or —NR[0]—, wherein R[0] represents hydrogen or a $C_1-C_6$-alkyl group, A[1] and A[2], independently of each other, represent a $C_6-C_{18}$-arylene or $C_1-C_{30}$-alkylene group whose aliphatic carbon chain is optionally interrupted by one to three heteroatoms and/or by one to two phenylenes or naphthylenes, the phenylenes or naphthylenes being optionally substituted by a $C_1-C_6$-alkyl group, and L[1] and L[2], independently of each other, represent a photoluminescent group, wherein a molar proportion of the repeating structural chain units of the formula (3) is from 0 to 99.5 mol-%, a molar proportion of each of the at least one repeating structural chain unit of the formulas (1) and/or (2) is 0.5 to 100 mol-%, and a sum of the molar proportions is 100%, wherein a compound of the formula (A):

(A)
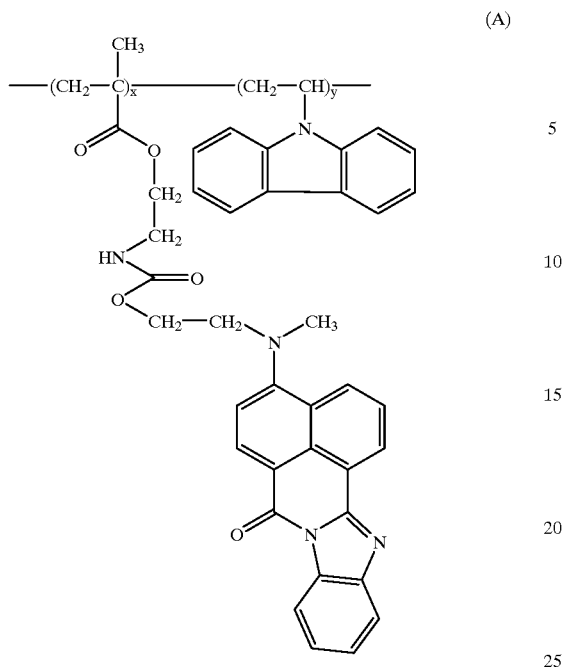
is excepted, and
wherein the copolymer is prepared by the following reaction scheme:
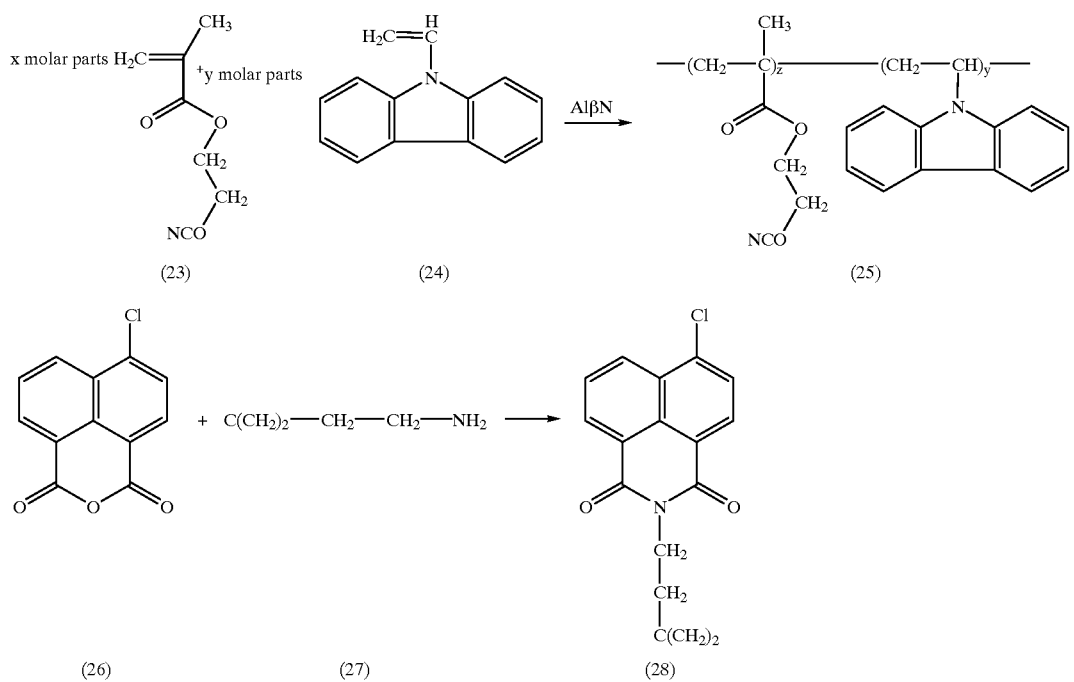

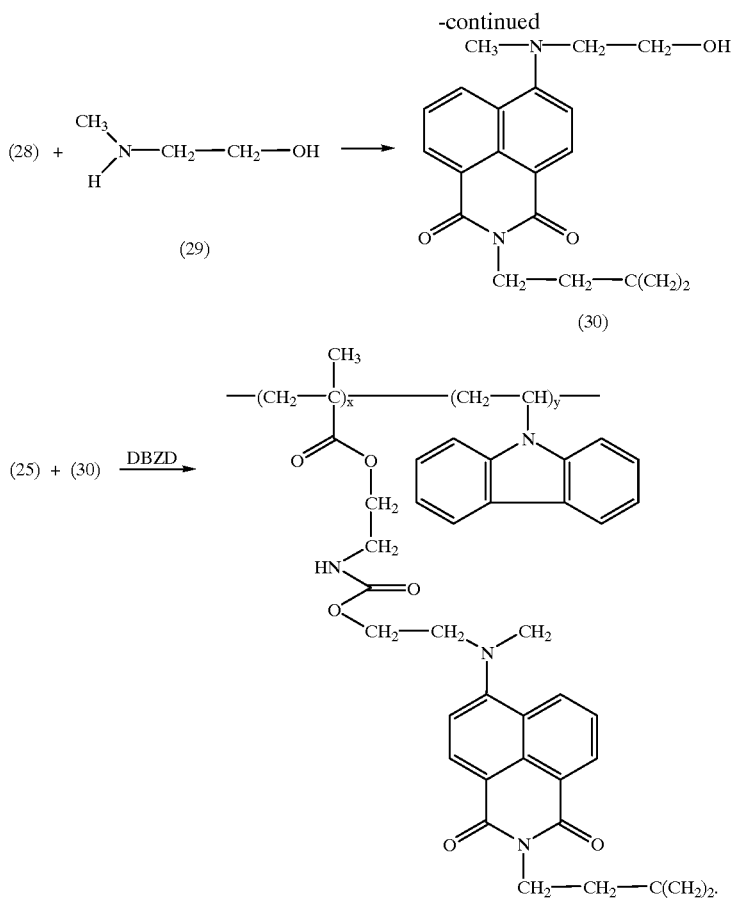
19. The copolymer according to claim 1, wherein the repeating structural chain unit of the general formula (3) is present.
20. The electroluminescent apparatus according to claim 16, wherein the transparent support is glass or a plastic sheet.
21. The electroluminescent apparatus according to claim 20, wherein the plastic sheet is a polyester, polysulphone or polyimide.
* * * * *